United States Patent
Pricop et al.

(10) Patent No.: US 8,816,620 B2
(45) Date of Patent: Aug. 26, 2014

(54) MATRIX INTEGRATED SEQUENTIAL MAGNETIC ATTRACTION ELECTRIC MACHINE

(76) Inventors: John Pricop, Port Moody (CA); Carlos Manuel Carvalheiro-Nunes, Richmond (CA)

(*) Notice: Subject to any disclaimer, the term of this patent is extended or adjusted under 35 U.S.C. 154(b) by 110 days.

(21) Appl. No.: 13/572,635

(22) Filed: Aug. 11, 2012

(65) Prior Publication Data

US 2014/0042941 A1 Feb. 13, 2014

(51) Int. Cl.
*H02P 1/04* (2006.01)
(52) U.S. Cl.
USPC .................. 318/400.09; 318/400.26
(58) Field of Classification Search
USPC ............... 318/400.09, 400.26; 310/126, 112; 439/39
See application file for complete search history.

(56) References Cited

U.S. PATENT DOCUMENTS

2010/0285674 A1* 11/2010 David et al. ............ 439/39

* cited by examiner

*Primary Examiner* — Karen Masih

(57) ABSTRACT

The invention discloses a reciprocal radial field electric machine based on the soft magnetic attraction principle, characterized by a plurality of active elements organized as a bi-dimensional cylindrical machine matrix and fed sequentially by an external power converter in order to derive a motoring or generation effect. The machine is comprised of a fixed stator matrix featuring salient poles and electrical coils, and a mobile rotor matrix featuring salient poles. The machine works on the principle of time integration of the discrete actions performed by its active elements. The bi-dimensional matrix organization of the active elements and the algorithms of their activation in both motoring and generation modes are key features for the functional cohesion of the machine. The design of this machine is based on a unique digital modeling method developed by the inventors, using exclusively the matrix calculus adapted to cylindrical matrices.

19 Claims, 22 Drawing Sheets

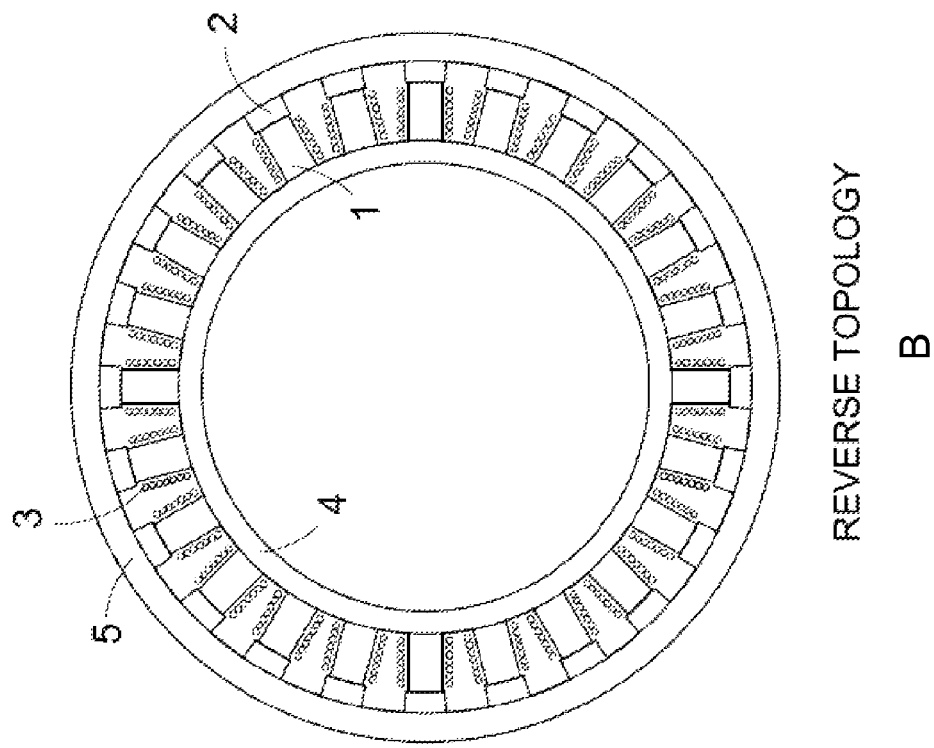
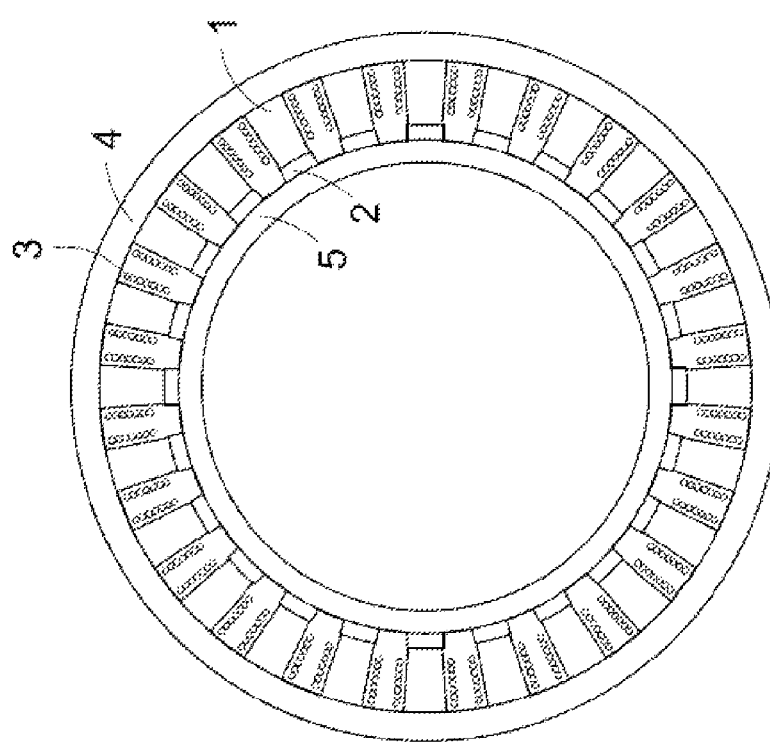
FIG. 3

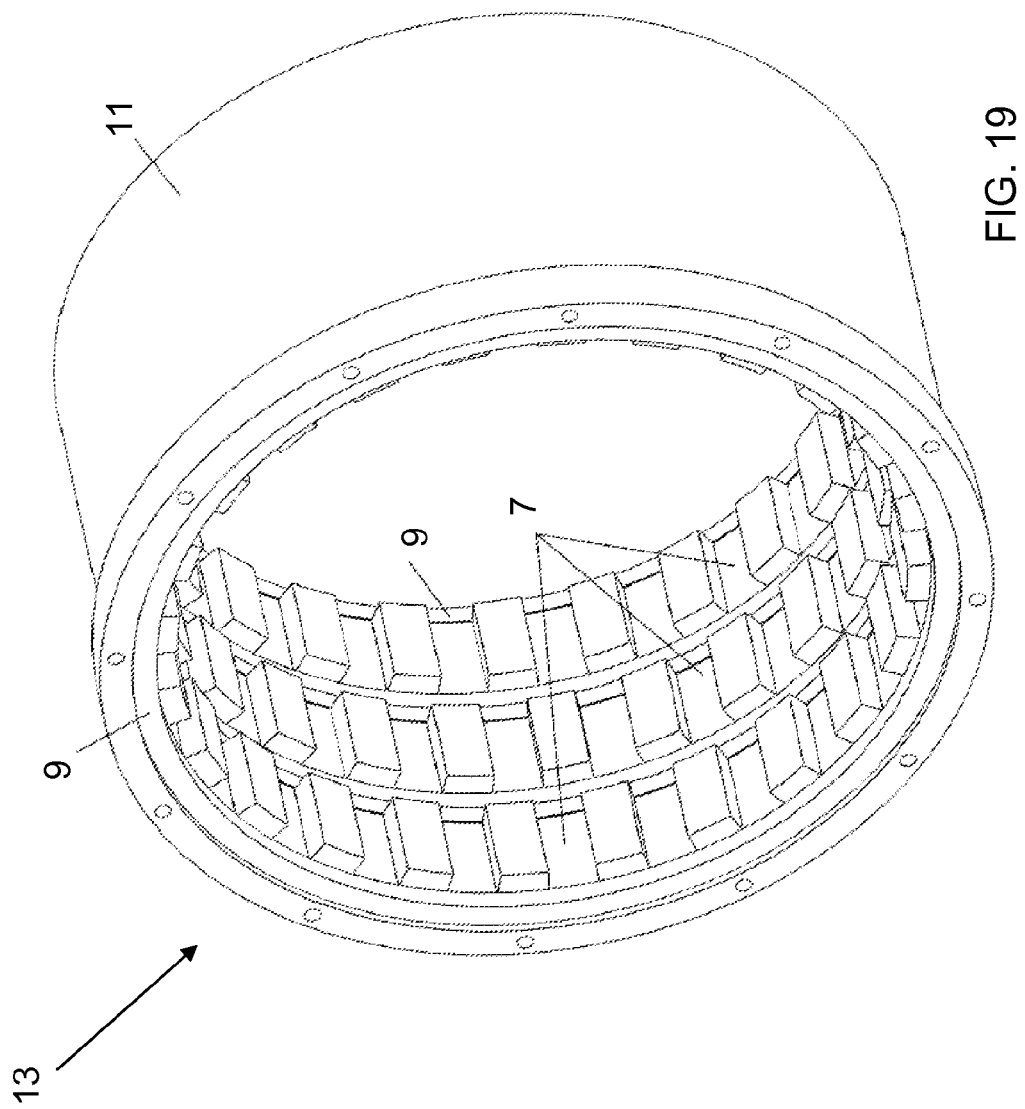

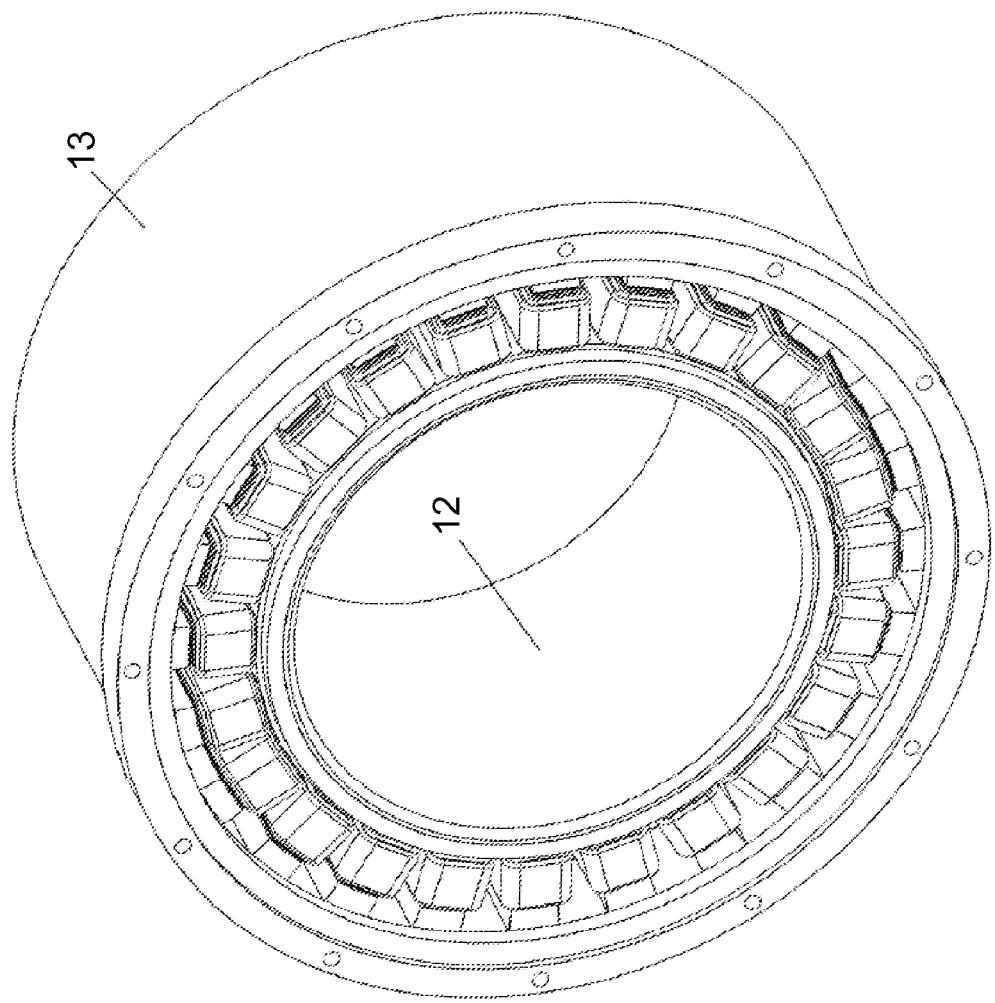

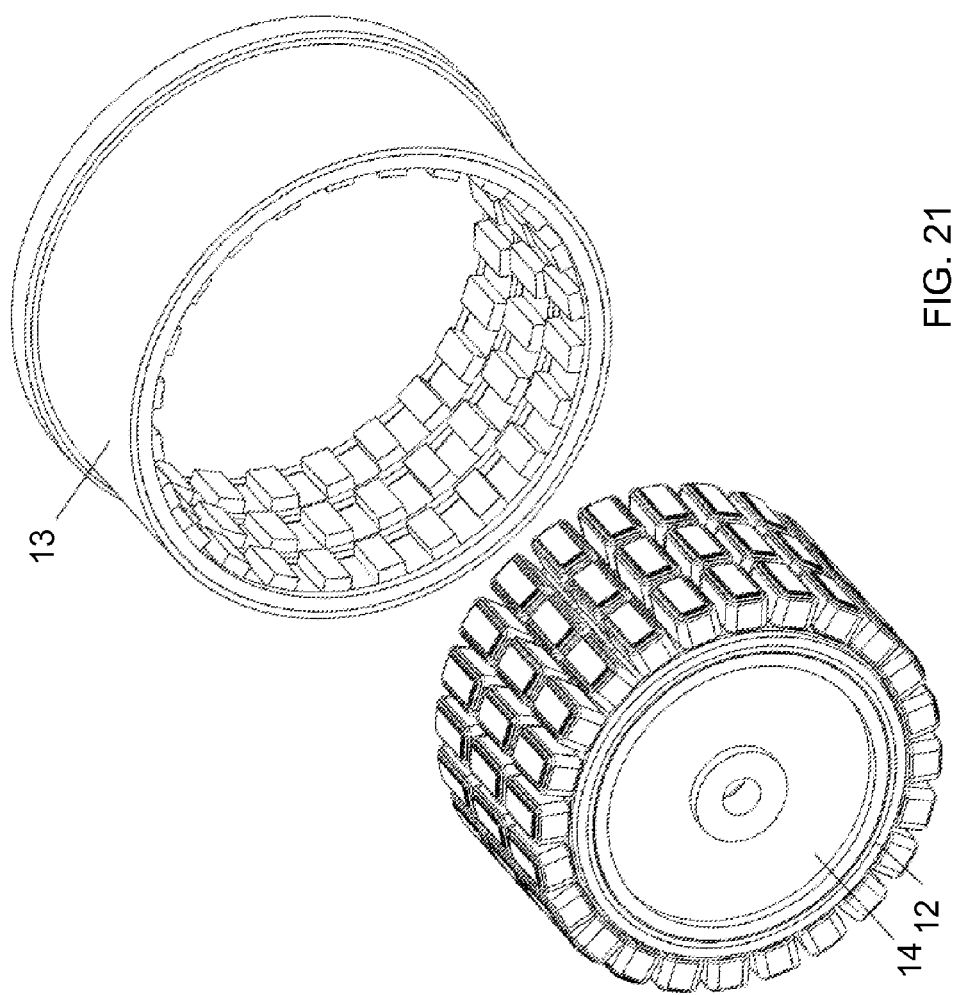

MATRIX INTEGRATED SEQUENTIAL MAGNETIC ATTRACTION ELECTRIC MACHINE

BACKGROUND OF THE INVENTION

1. Field of the Invention

The invention pertains generally to electric machines. More specifically, the invention relates to the class of electric machines using no permanent magnets and operating solely on the principle of magnetic attraction between an array of soft magnetic parts that are mounted on a fixed base (usually referred to as "stator") and another array of soft magnetic parts that can move with respect to the fixed base (usually referred to as "rotor" or "translator"), where only the array on the fixed base contains electrical windings connected to a power converter and controlled by a logic unit.

In order to ascertain accurately the place of the machine that constitutes the subject of this invention within the aforementioned class of machines, a brief exposé on the specificity of these machines is presented in this section.

This class of machines has two essential features: it employs no permanent magnets in either the stator or the rotor magnetic paths, and has no electrical windings on the rotor. The first feature ensures that such machines are free from the detrimental effects of the electromagnetic interaction that may occur between the magnetic field of the permanent magnets and the stator windings when the rotor is spinning. This is achieved by using exclusively soft magnetic materials for the magnetic circuits.

The second feature allows a very simple and robust construction of the rotor and eliminates the need for slipping electrical contacts for the rotor windings.

An essential trait of such machines consists in the exclusive use of the soft magnetic attraction force between the stator and rotor magnetic parts in order to operate (magnetic repulsion between these parts is not possible in the absence of permanent magnets). The soft magnetic attraction force is generated by applying electric current pulses in the stator windings when the inductance of these windings can vary (increase or decrease) as a result of rotor motion. When the current pulses are cut off, the magnetic attraction force is no longer generated (this being the meaning of the term "soft magnetic attraction" in the context of this presentation). In literature, the machines using this mode of operation are generally referenced as "switched reluctance machines", which the authors of this invention consider to be a misnomer (the reason being that the magnetic reluctance of such machines is a physical property that cannot be "switched" on or off, but can be varied rather gradually; the term "variable reluctance machines" would be more appropriate to reference this kind of machines).

A functional analysis of this type of electric machines shows that they operate in a sequential mode by constantly "chasing" the positions of increasing stator inductance caused by the rotor motion (in motoring mode) or the positions of decreasing stator inductance caused by the rotor motion (in generation mode). To operate continuously, the windings of these machines need to be connected to the electrical power supply only when this condition is met and disconnected when the condition is not met. Therefore, such machines cannot operate by plugging them directly into an electrical power line. For instance, a permanent DC power line feed would end up locking the rotor in the nearest aligned position with some of the stator poles until the feed is removed. This is due to the fact that the position of alignment of the active stator poles with the rotor poles is a position of minimum reluctance of the magnetic system, which is always a position of stable equilibrium. Consequently, these machines can work only in sequential feed mode. To achieve this, their operation requires an electrical interface to the power line (a power converter) and a logical interface to provide the correct time sequence for the electrical interface operation (a logic unit). Although these three components (the basic machine, the power converter and the logic unit) are physically separate parts, all three are indispensable to operate an autonomous (stand-alone) electric machine based on the soft magnetic attraction principle.

Due to the sequential operation mode, these machines can be treated essentially as integrators of discrete actions. A discrete action is produced, for instance, when a machine winding (located on the stator) is fed an electric current pulse. The magnetic parts of the machine affected by this pulse constitute an active element. If a machine is comprised of multiple interconnected active elements, the superposition of their discrete actions along the time axis constitutes a time integration function performed by the machine. For this type of machines, an active element consists of a pair of stator-rotor poles that are interacting via the magnetic attraction force produced in the air gap between them. To obtain a continuous output, this type of machine is divided structurally into several groups of active elements called "phases" operating in sequential time windows, which can produce discrete actions aligned more or less seamlessly along the time axis. All the active elements comprising a phase are activated simultaneously and therefore create discrete actions that are always situated in the same time window.

An essential feature of the phases that comprise a stand-alone electric machine is that they are functionally co-dependent during operation. This means that the operation of any of the constituent phases depends on the correct operation of the other phases in order to fulfill its function, otherwise the machine as a whole cannot operate as intended. If a phase of a stand-alone machine stops working, the machine might still operate at reduced capacity but with de-rated parameters (high-speed machines), or might stop working altogether (low-speed high-torque machines). This aspect is important in order to make a clear distinction between stand-alone machines and systems of machines. A system of machines comprises two or more stand-alone machines (or their main parts) assembled together in a specific arrangement in order to achieve a certain functionality (higher power, smoother operation, multiple loads handling, redundancy, etc.) that an existing stand-alone machine cannot provide. If one of the machines in the assembly stops working, the rest of the assembly may continue to work unimpeded. By contrast, a stand-alone machine is not reducible to a simpler structure without altering fundamentally its operation.

The vast majority of the machines based on the soft magnetic attraction principle are based on the rotary topology, where the moving part is a spinning rotor unit. Because of their shape, these machines have cylindrical symmetry. Consequently, the magnetic force developed in the air gap between the stator and rotor poles can have components along the axial, radial and tangential directions of the machine. The only component that can be exploited for practical use in the existing machines is the tangential one, since only a tangential force can generate a torque that cause the rotor to spin, but this component can never be obtained alone in a rotary topology. In order to remove the effects of the other two components (which are torque-neutral), the machine designer must devise solutions to either reduce these components to negligible values or to use the machine symmetry to cancel them out. From this perspective, there are two types of machines that can be built on the rotary topology: the radial field type and the axial field type. The radial field machine has a radial magnetic field in the air gap, which produces a powerful radial force that causes the stator poles to attract the rotor poles radially when activated. This force cannot be used, since it is torque-neutral, and can be cancelled effectively if the machine is designed to activate simultaneously stator-rotor pole pairs positioned in diametrically opposite locations. This is the reason why this type of machine has always an even number of stator poles. The axial component, also torque-neutral, can be annulled by positioning the rotor inside the stator symmetrically with respect to the axial direction of the machine.

The axial field machine has an axial magnetic field in the air gap, which produces a powerful axial force that causes the stator poles to attract the rotor poles axially when activated, but it is torque-neutral. This force can be cancelled either by using axially-loaded bearings or by using a pair of stator units positioned symmetrically on both sides of a common rotor unit. The torque-neutral radial component is not generated in this type of machine, so there is no need to cancel it.

In light of the exposé presented above, the machine that constitutes the subject of this invention is a stand-alone radial field machine. The main objective of the invention is to produce an ingenious machine structure that can be analyzed and designed using digital modeling, can operate based exclusively on digital pulses, can execute compound types of motion (such as rotation and translation), and can reach the highest energy efficiency attainable with the materials and technology available today.

In order to achieve these goals, the machine is based on the matrix calculus and is structured (as will be detailed in a separate section) as an assembly of two coaxial cylindrical matrices of active elements, one fixed and one free to move about the common axis. The active elements are operated sequentially by a multi-output electrical power converter interfaced with a logic control module. The subject of the invention belongs to the category of fully reciprocal electric machines, therefore this machine may be operated in either motoring or generation mode without any hardware adjustment.

2. Description of Prior Art

The best known approaches in prior art that are based on the soft magnetic attraction principle are those pertaining to the class of multi-phase radial field electric machines referenced previously as "switched reluctance machines" (SRM) and the class of multi-phase radial field electric machines known as "stepper motors" (SM). The multi-phase machines belonging to these classes are built with all the phases located on common stator and rotor units.

The development of such machines in rotary form has settled for the type of multi-phase electric machines with a certain number of stator poles per phase (the simplest version having two diametrically opposed poles), where a single stator unit comprises all stator phases distributed more or less evenly on its circumference and a single rotor unit comprises all rotor poles distributed in similar fashion. In order to obtain a continuous rotational motion, the stator and rotor units comprise a different number of poles and the stator windings are activated in a certain temporal sequence by an external power converter, so that only the stator poles of the same phase can come into radial alignment with certain rotor poles at any given time. The ratio between the number of stator poles and the number of rotor poles is a key machine parameter and is usually determined by the number of machine phases. These machines are inherently variable speed machines and cannot be operated directly from the power line, as shown previously. This is the reason why a power converter is always necessary to drive them (in motoring mode) or to convert their electrical output into standard line power (in generation mode). This combination is generally called a "drive". The correct timing for the activation of their phases by the power converter is either assisted by a position sensor/encoder built into the machine or inferred by means of certain algorithms (sensorless timing) in the more advanced converters. The magnetic attraction force between the stator and rotor poles is produced in the air gap between them and is dependent on their relative position. In operation, the tangential component of the magnetic force produced by the momentarily active phase brings the closest rotor poles from an unaligned position to the aligned position with its stator poles, from which the next phase, becoming active, brings the rotor poles to another aligned position, and so on. A continuous rotating motion of the rotor is therefore obtained by activating the phases sequentially in order to force the rotor unit to spin in the desired direction.

The majority of the machines built on this principle are radial field machines, owing to their simple core construction. The magnetic circuit of the phases can have either a long path (when the phase stator poles are positioned in diametrically opposite locations) or a short path (when the phase stator poles are positioned in adjacent locations). Although the short path solution is more advantageous for many reasons (especially high energy efficiency), in the classic design it has a significant drawback due to the higher magnetic interference between phases and uneven magnetic pull on the rotor due to the inadequate cancellation of the radial component of the magnetic force around the machine circumference. For this reason, most machine designs use the less efficient long path solution.

An in-depth analysis of the current state of the art reveals a series of limitations encountered in the operation of such stand-alone radial field machines. A straight treatise on this type of machines will show both the pros and cons of their operation. Among the pros, the most significant ones are: quasi-independence between the machine phases (which affords fault tolerance), simple rotor construction (which offers high reliability in operation, especially at high rotation speeds), high starting torque, high energy density and relatively inexpensive manufacturing. All these features are a direct consequence of the distinctive principle of operation, which is based exclusively on the soft magnetic attraction force (no permanent magnets required). Among the cons, the most problematic ones are those encountered in motoring mode: uneven torque on the rotor (which causes shaft fatigue, vibrations and acoustic noise), the onset of negative (braking) torque at high rotational speeds (which reduces the energy efficiency) and the low duty cycle achievable per phase due to the extra time required to unload the magnetic energy stored in the air gap (which reduces the output power capability).

To counter some of these problems, most solutions found in the prior art are largely geared towards compensating the basic machine limitations through special power converter features. The most effective of these solutions consists in the current-shaping technique built into the power converter. This feature allows a significant reduction of the torque ripple by altering the waveform of the current pulses fed into the machine phases. This technique can also help minimize the negative torque by altering the cut-off timing of the current pulses. However, the current-shaping technique reduces the phase duty cycle. At any rate, any such technique cannot solve single-handedly all the problems that are inherent to these machines. In addition, this strategy requires expensive power converters or sophisticated feedback loops in the logic unit.

Among the solutions catering to the basic machine features, most are concerned with the refinement of the stator and rotor pole geometry in order to minimize the drawbacks of the standard machine characteristics. There are solutions presenting various pole shapes and profiles (such as the "shark" pole profile) and pole orientations (such as the slanted axial orientation), intended to ameliorate certain basic machine deficiencies. Other approaches found in the prior art that are supposed to tackle the problems at the basic machine level are actually work-around solutions which depart from the irreducible structure of the stand-alone machine, transitioning into the realm of systems of machines. This strategy does not constitute a set of proper solutions to the basic machine problems and can be treated at best as a source of pseudo-solutions when altering the basic machine structure is not effective or not even possible. Moreover, this strategy is not specific to the stand-alone multi-phase radial field machines (the concept of systems of machines represents a broad domain, covering many types of machines).

One of the main advantages claimed by the existing electric machines based on the soft magnetic attraction principle is their insensitivity to the failure of one phase, due to the assumed lack of magnetic coupling (interaction) between phases. While this would be a valid claim in principle, it is based on an assumption nonetheless. In actuality, the phases of these machines are never magnetically independent, since they are built on the same stator and rotor units and inherently share common magnetic paths. Despite the best efforts at the design stage, the phases of these machines still have typically 6% to 15% mutual flux linkages between phases. Therefore, the assumption about the magnetic independence of phases is only a simplification, not a genuine characteristic of these machines, and this will not change as long as the phases of these machines will continue to be built on common stator and rotor units.

The design of various incarnations of the machines in prior art is usually based on more or less sophisticated analogue modeling of the basic machines. Due to the dovetailing of the phases on common stator and rotor units, in prior art there are drastic limitations on the optimization of the basic machine design, mainly owing to the commonality of magnetic paths between adjacent phases. As a consequence, the stator-rotor pole size ratio is limited to a very narrow range of values, which precludes the maximization of the pole duty cycle and results in poor energy density per phase. Moreover, because of these undesirable flux linkages between phases, the analysis of such machines is difficult and devising accurate mathematical models to perform a satisfactory analysis is very laborious. In order to take into account the parasitic inter-phase flux linkages, the models are further complicated by adding second-order flux sources, making the machine analysis even more laborious. Any change in the machine design will lead to a revision of the model and a new analysis must be carried out to assess the machine performance. Due to the difficulty of machine analysis, the embodiment of various designs often fall off the mark significantly when tested against the initial design parameters, and necessary design revisions are usually required to reach the target.

SUMMARY OF THE INVENTION

Overview

In order to surmount the limitations mentioned above, the invention presented here takes a totally different approach in the design of machines based on the principle of soft magnetic attraction. Since such machines work exclusively on the principle of integration (superposition) of discrete actions that are strictly limited in space and time, the wealth of knowledge currently available in the domain of systems comprised of discrete elements (such as the digital systems) has been applied by the inventors in order to derive a novel approach in the theoretical analysis of these machines. The goal of this analysis is to lay the groundwork for a totally different machine structure that can be equated to a system of purely discrete elements suited for digital modeling (doing away completely with the analogue modeling). In this invention, the new approach is based on the concept of matrix organization of the discrete (elementary) actions that are realizable in a given electro-magnetic system. In the case of electric machines based on the principle of soft magnetic attraction, the elementary action is the magnetic attraction occurring between a single stator pole and a single rotor pole upon injecting an electric current pulse of constant amplitude in the coil residing on the stator pole. The current pulse with the required parameters is provided by a multi-output electrical power converter. Once the elementary action is defined in this way, the next step is to organize all possible elementary actions as a bi-dimensional matrix of elements following a specified order, depending on the targeted use of the machine. The last step is to apply the operational calculus to the machine matrix in order to derive the parameters required to operate the machine (such as the tangential or axial magnetic force developed by each active element, the torque generated by the rotor, the output mechanical or electrical power of the machine, the rotational or translation speed, etc.). The operational calculus provides also the correct solutions for the sequence in which the active elements need to be activated in order to perform the required time integration of the elementary actions. These solutions will be used during the design stage of the machine as initial conditions. They are also recorded in electronic form (either in a non-volatile memory module or hard-wired on an electronic board) in the logic control unit associated with the power converter selected to drive the machine, in order to be recalled as scanning algorithms for the matrix elements during operation. For each specific operation mode, the machine will require a specific scanning algorithm. In the context of this invention, by "scanning the matrix elements" we mean assigning each active element in the matrix a value for the voltage across its coil at all times. Being a discrete parameter in the digital modeling, this voltage can have only two values: low (zero) and high (equal to the voltage of the power supply). Therefore, the scanning operation will cause the power converter to apply a high voltage to the coil of each active element only when the element is required to become active (that is, to generate a magnetic attraction force) and to apply no voltage to the coil when there is no such requirement. The correct sequence for the voltage application to the coils of the various active elements is contained in a small electronic program and is called "scanning algorithm". For every matrix machine configuration, the scanning algorithms are different for various modes of operation and are specific to that configuration only. In operation, the scanning algorithms are recalled by a logic control unit and executed as concatenated temporal sequences for each active element. In this way, the correct time integration of the elementary actions produced by the machine matrix is obtained natively and the machine will operate as intended.

This approach simplifies greatly the design of the machine, since in this case the only essential part to design is the stator-rotor pole pair producing the elementary action, not the whole machine. Once the pole pair is fully specified, all that remains to do is determine the total number of pole pairs suitable for the target application and organize them in the rows and columns of the machine matrix. A rotary machine will have the elementary action units (the pole pairs) arranged in a matrix with axial and tangential (circumferential) dimensions, which define the shape of a cylinder. This is why, in this approach, the active elements of the machine will always occupy designated locations on two cylindrical matrices: one fixed (which is stationary with respect to the chosen system of coordinates) and one mobile (having degrees of freedom along the axial and/or tangential directions).

The stator-rotor pole pair is a fluid concept and should not be understood as a stator pole paired permanently with a certain rotor pole. Rather, in the logic presented here, a given stator pole is paired with the nearest rotor pole that happens to be in its vicinity at the time of electric current pulse application. Therefore, a stator pole can be paired sequentially with all the rotor poles located on the same matrix row during a full rotor revolution (in the case of rotating rotors) or with certain rotor poles located on the same matrix column during a full translation motion (in the case of translating rotors). Due to the sequential pairing of the matrix organized stator-rotor poles for the purpose of obtaining an integrated output based on the magnetic attraction force, the resulting machine is called generically a "matrix integrated sequential magnetic attraction machine". For brevity, the term "matrix machine" will be used in this document.

To make the machine ready to work with existing power converters built with multi-phase outputs, it will be useful to retain the idea of phase and, for a subclass of such machines, choose to group the matrix elements as phases. As shown previously, the distinctive feature of the phase is that all the pole pairs in its structure will be activated at the same time irrespective of their location. There are countless options to arrange the machine phases in a rotary machine based on the matrix organization. The simplest ones are as columns on the cylinder generators or as rows on axially spaced circles (for reference, the columns of a cylindrical matrix are arranged along the cylinder generators, while the rows are circles on the surface of the cylinder contained in planes perpendicular to the cylinder axis). Due to their simplicity, each of these two options has some definite advantages in optimizing certain output parameters of the machine. However, these readily apparent options do not provide the only suitable ways to organize the matrix elements—any other practicable solution for the matrix organization can offer a valid way to start a machine design.

A direct consequence of the discrete systems analysis points to the fact that it is increasingly difficult to obtain continuous output from this kind of machines if the number of pole pairs is smaller than a certain threshold number, due to the unacceptable amplitude of the ripples in the integrated output (the so-called "discretization noise"). The principle of integration of discrete actions implies that the higher the number of elementary actions, the smaller the ripples in the output parameters and the finer the gradation of parameter tuning (a feature usually called "resolution"). This observation is extremely important in the machine design for any given purpose. In cases where each stator winding is connected to a separate output of the power converter, the corresponding matrix is comprised of independent elements and the machine resolution will be equal to the matrix resolution (which is proportional to the total number of matrix elements). This is the maximum resolution achievable in a machine and it will ensure the finest tuning of the machine parameters. In cases where the stator windings are connected in groups of equal number of elements and each group is connected to a separate output of the power converter, the corresponding matrix is comprised of co-dependent sub-matrices. The original matrix resolution is reduced to the resolution of a sub-matrix, which is proportional to the total number of elements divided by the number of groups. As a general rule, the torque ripple and the rotational speed of the rotating matrix machines are inversely proportional to the total number of active elements. Therefore, in order to obtain a high-torque low-speed machine with smooth rotor motion, the machine matrix must comprise a high number of stator-rotor pole pairs. This is easy to achieve in matrix machines, because the pole pairs can be organized without any restriction as bi-dimensional matrices with any number of rows, as opposed to the existing machines where the poles can be distributed in only one dimension.

General Description

Described in the specific terminology used in the field of electric machines, the invention presented here relates essentially to a variable speed radial field electric machine. However, the concept and the solution chosen to build such a machine are fundamentally different from the existing solutions, the originality of the invention consisting in the adoption of an original approach in the analysis and design of the machines comprised exclusively of soft magnetic attraction elements. This approach treats each stator-rotor pole pair as a generic active element producing a rectangle-shaped discrete action on the time axis. Specifically, a discrete action can be represented by a force or by a torque that can cause the machine rotor to move along the allowed degrees of freedom. A discrete action of this kind has only two significant parameters: time duration (which can vary) and amplitude (which is maintained constant). Such characterization allows the use of mathematical methods common to the digital systems and suggests that a machine can be built using a plurality of identical active elements arranged orderly as a bi-dimensional matrix. Capitalizing on this approach, a new machine structure has been developed following the matrix arrangement, which is based on the time integration of discrete actions following proper integration (scanning) algorithms. This opens the door to a new sub-class of machines based on the soft magnetic attraction principle: the integrated matrix machines.

In the new approach, the active element is completely stripped of its physical connotations and is treated as a "switch" that can be turned ON or OFF. In the ON state, the active element performs a constant action (such as acting on the a constant magnetic attraction force), while in the OFF state the active element does not perform any action. This is possible because all active elements are presumed to be identical and therefore will produce identical discrete actions at all times. Moreover, as will be shown later, the discrete actions are compliant with the definition of a generic "pulse", where the amplitude is constant for the whole range on pulse durations. This strategy allows the machine to be treated as a matrix of generic elements without any relation to the physical layer, therefore the matrix calculations can be done using known mathematical methods without restriction. Of course, the generic active element needs to be addressed as a physical entity at a certain stage of the machine design, but this will not affect the results obtained from the matrix analysis performed using only generic active elements.

Because the real active elements are not fully independent of each other on the physical layer, the relationships between these elements have to be considered in the matrix analysis and entered in the calculations as initial conditions. The only possible physical relationships between any two elements in a bi-dimensional machine matrix are: mechanical linkages, electrical interactions, and magnetic interactions. The mechanical linkages are inherent, since the machine must possess physical integrity as a rigid assembly of solid bodies. From this perspective, the active elements will be organized in a rigid matrix having definite size and shape, which remains unchanged once the machine is built. Therefore, it is a given that the mechanical linkages between the active elements will always be present in a matrix machine. Various electrical interactions may exist between active elements if they are organized in groups of interconnected elements (interconnected windings at the physical level). The electrical interactions are very easy to manage and can be completely eliminated by connecting all the stator pole windings to separate power converter outputs. Certain magnetic interactions may exist between active elements if they share common magnetic paths or are located in the physical range of magnetic influence between them. These interactions are more difficult to manage, since the magnetic paths are sizeable and the magnetic field has significant spatial expansion compared to the machine dimensions. Nevertheless, the number of magnetic interactions can be reduced to a minimum by designing the physical layer of active elements (the stator-rotor pole pairs) as linear arrays of magnetic circuits with interaction only between adjacent pole pairs along one matrix dimension (such as the circumference) and allowing enough spatial separation between neighboring linear arrays in the other matrix dimension (such as the axial direction). In this way, the neighboring arrays can be made completely independent magnetically. Such complete magnetic separation between pole pairs is possible only in the case of matrix machines and constitutes a genuine and unique feature of these machines.

The possibilities offered by the versatility of matrix arrangement are staggering. When the number of interactions between various active elements is minimized, the highest number of options to arrange these elements can be reached. However, as in any system with many possible states, simple arrangements can be singled out which offer practical advantages over more intricate arrangements. In such cases, it is useful to explore the range of possible arrangements starting from the simple ones. A quick glance in this direction shows that the simplest machine matrix that can work is the matrix with all the active elements connected electrically together and with all the matrix rows connected magnetically together (meaning no physical separation available between adjacent rows). This machine has the maximum number of interactions allowed between the active elements (and, consequently, the minimum number of possible arrangements). A close look at the machine based on this specific matrix will reveal an interesting aspect: this machine is functionally equivalent to a single-phase switched reluctance machine built for low speed and high torque. If the electrical interactions are reduced by connecting the active elements into several groups and the magnetic interactions are reduced by spatially separating the matrix rows, a significant number of additional options become available for the matrix organization. One of these options will have the groups of active elements arranged as rows on the cylindrical matrix. This particular arrangement is interesting because it is functionally equivalent to a multi-phase switched reluctance machine. However, the physical structure of the stator and rotor matrices is fundamentally different from the structure of the stator and rotor units of the existing switched reluctance machines. By reducing further the electrical interactions and/or magnetic interactions, the number of possible arrangements will increase accordingly. Therefore, the particular arrangements that can be functionally equivalent to existing machines constitute only a subset of the wide range of possible matrix arrangements. The remaining, more numerous options, will yield machine arrangements which have no correspondence to existing machines, therefore these arrangements will result in completely new machines with certain new properties that can be used for various practical applications. For instance, one subset of matrix arrangements can be built physically on a topology that allows two degrees of freedom for the rotor: axial motion (by allowing the rotor to slide along the rotation axis) and rotational motion (which is the only motion obtained in the existing machines). This subset of matrix arrangements will result in machines that are totally new (never built before). Such machines can perform two functions independently: translation and rotation of the load attached to the rotor. These two types of motion can be performed sequentially or at the same time (which results in a spiral or helicoidal motion of the load). This is possible only in the case of integrated matrix machines, the reason being that the underlying matrix of such machines has two dimensions (axial and tangential) along which the rotor motion is possible without altering the basic mode of operation.

An immediate conclusion that can be drawn from the above considerations is that the integrated matrix machines constitute a generic class of machines which may include the switched reluctance machines (SRM) as a sub-class. In other words, the SRMs can be regarded as particular cases of integrated matrix machines. This conclusion constitutes the basis of our claim that the integrated matrix machines represent a new sub-class of machines, which may include some of the existing machines (such as the SRMs) as particular cases.

Principle of Operation

The generic matrix machine presented here is a true reciprocal electric machine and, therefore, may be operated either as electric motor or as electric generator. The machine output (either mechanical or electrical) is obtained by integrating the discrete actions of all active elements in the machine matrix (stator-rotor pole pairs) following the integration (scanning) algorithms embedded in the logic unit, as shown previously. The succession of discrete actions is generated in such a way by the scanning algorithms as to ensure a continuous, gapless integrated output (especially in motoring mode). This condition ensures that the machine can always start and operate on its own (without external aid), regardless of the position of the rotor matrix at rest. Therefore, the basic principle of operation consists in the superposition (time integration) of the discrete actions generated by various subsets of active elements arranged in designated positions in the machine matrix under the control of the logic unit containing the scanning algorithms.

The matrix machine is operated in conjunction with a power converter, which contains a multiple-output power driver interfaced with the logic unit, as shown in the block diagram in FIG. 13. Based on the terminology used in literature, the combination shown in this block diagram can be regarded as a "drive"; however, in the context of this invention it will be called a "stand-alone machine" due to the tight integration of the constituent parts of the generic "drive". The role of the power converter is that of electrical interface between the power line and the machine windings. The power line can be either a rectified standard AC power feed or a DC feed (such as a battery). In motoring mode, the power converter transforms the continuous line power into electric current pulses of constant amplitude and variable duration, which are applied in sequence to the active elements. In generation mode, the power converter transforms the raw electrical power generated by the machine into DC power (usually feeding a battery via a charging module) or AC power with the correct parameters required to comply with the power line standards. The logic unit contains the matrix scanning algorithms for each mode of operation, stored in a digital non-volatile random access memory (NV-RAM) module.

As mentioned, the operation of the matrix machine is based on the principle of soft magnetic attraction performed by the active elements arranged as a matrix. The stator-rotor pole pair which constitutes the generic active element (shown in FIG. 1A) is intended to interact via the tangential or axial component of the magnetic force generated in the air gap between the stator and rotor poles when the stator winding (shown in FIG. 1B) is fed an electric pulse of constant amplitude (these forces are shown in FIG. 1A, where $F_T$ is the tangential component and $F_A$ is the axial component of the magnetic attraction force). The interaction between the stator and the rotor poles is limited spatially to the positions of partial overlap between these poles during the rotor motion. The electric current pulse is defined by means of its amplitude and duration. The pulse amplitude will be maintained quasi-constant at all times by means of known current chopping techniques (the current pulse waveforms are shown in FIG. 7 for the motoring mode and FIG. 8 for the generation mode). In this context, by current pulse amplitude we denote the mean value of the electric current, around which the small variations resulted from the chopping method are situated. The duration of the current pulse is not fixed, being dependent on the angular velocity of the rotor (the higher the angular velocity, the shorter the pulse duration).

In motoring mode, the overlap between the stator and rotor pole pairs is minimal at the onset of electric current pulse and will increase gradually as the rotor pole is pulled by the tangential component of the magnetic force towards full alignment with the stator pole. The electric pulse is cut off when the rotor pole is in full alignment with the stator pole. Therefore, the electric current pulse is applied as long as necessary to increase the overlap of the rotor and stator poles, after which it is cut off. Along this motion path, the inductance L of the stator winding is increasing gradually from a minimum value $L_m$ to a maximum value $L_M$ (as shown in FIG. 5M). If the slope of inductance variation is presumed constant along this path, the magnetic force created by the stator winding is also constant (as illustrated in FIG. 5F, 5G, 5H and 5I). This assertion is based on the formula of the tangential component of the soft magnetic force generated in a closed magnetic circuit with a small air gap. As demonstrated in the literature, this force is expressed as $F=k_m(dL/d\theta)I^2$, so it is proportional to the slope of variation of the coil inductance L with the angular rotor rotation θ (expressed mathematically as $dL/d\theta$) and to the square of electric current pulse amplitude (expressed as $I^2$). The expression of the magnetic force shows that its direction does not depend on the direction of the electric current through the coil (since $I^2$ is always positive) and it can be only an attraction force. This dependence is valid only below magnetic core saturation. A constant of proportionality $k_m$ (dependent on the magnetic and geometric specifications of the pole pair) links the two essential parameters to the magnitude F of the magnetic force generated. Since the coil inductance L is a double function of angular rotation θ and current pulse amplitude I, the inductance variation slope is not linear for the entire range of current pulse amplitudes, due to the non-linearity of the magnetic properties of the magnetic circuit versus the coil current. The design stage of the stator-rotor pole pair has to ensure that the deviation of the inductance slope from linearity is minimal. Assuming linear inductance slope and given constant current amplitude, the resulting magnetic force causing the rotor to spin or slide is also constant when the angular rotor rotation θ varies and the motion of the rotor is therefore obtained under constant force.

Since the force acts at the periphery of the rotor matrix which, being round, has a constant radius, it follows that the motion of the rotor is performed under constant torque. If the matrix is organized as groups of active elements connected to separate outputs of the power converter, the superposition of the discrete actions performed sequentially by these groups can be done seamlessly on the time axis. Under these conditions, the mechanical output of the machine will be a constant torque equal to the total torque generated by one group (as shown in FIG. 5K). The number of active elements in one group will therefore determine the amplitude of the resulting output torque generated by the matrix machine.

In generation mode, the same sequence of events holds, with the essential difference that the active elements are activated during the motion of the rotor pole out of alignment with the stator pole. Along this motion path, the inductance variation of the stator winding has negative slope, decreasing gradually from a maximum value $L_M$ to a minimum value $L_m$ (as shown in FIG. 5M). In this case, the magnetic force acts in opposite direction to the rotor motion, trying to resist the motion of the rotor pole out of alignment. In the matrix machines, the magnetic force is always an attractive force, meaning the rotor pole will always be attracted towards the stator pole. When a prime mover forces the rotor pole to move out of alignment with the stator pole, the magnetic force produced by the active elements will therefore act against this motion. Under these conditions, the mechanical energy provided by the prime mover will be transformed into magnetic energy via the opposing magnetic force. Since the magnetic energy is proportional to the inductance of the stator winding and this inductance is gradually reduced due to rotor pole moving out of alignment, the magnetic energy has to be removed gradually from the magnetic circuit in order to keep the electric current constant (this condition is enforced by the power converter in the same way as in motoring mode). In generation mode, the electric current flowing between the stator windings and the power converter is bidirectional, meaning it has alternate flowing directions: as supplied current carrying electrical energy from the converter to the windings, and as reverse current carrying electromagnetic energy from the windings to the converter (as shown in FIG. 9). Consequently, the magnetic energy is being transformed into electrical energy by the power converter via the reverse electric current generated by the collapsing magnetic field of the stator windings (concentrated in the air gap). The reverse electric current carries the energy of the magnetic field to an electrical storage device (such as a capacitor or a battery) connected to the power converter until the magnetic energy in the air gap is depleted to a minimum value reached when the overlap between the stator and rotor poles is minimal. This is the mechanism of transforming the mechanical energy provided by a prime mover into electrical energy by the matrix machine in generation mode. Due to the complete independence of the phases, in the matrix machine there is no restriction to the current pulse duty cycle, therefore the generation mode can be made very efficient by allowing the stator windings to operate at full current loading for the whole duration of the negative slope of inductance variation. This kind of operation is valid for the whole range of rotational speeds. The combination of these two special features opens the possibility of building extremely energy efficient variable speed generators, suitable for prime movers that can provide time-varying mechanical energy (such as the wind turbines), without the need for speed regulators or speed shifters (gear boxes).

Due to the versatility of this machine, the modes of operation are not limited to the generic motoring and generation modes. Combinations or variations of these generic operation modes can yield compound operation modes such as: regenerative braking (when the machine is switched into generation mode with the rotor spinning and the load engaged until the rotor is brought to a rest), holding with full load engaged (when the machine is switched into motoring mode with the rotor forced to remain at rest against a load trying to move it), rotational oscillation (when the machine is switched alternately between motoring forward and motoring in reverse, with full load engaged), position seeking (when the machine is switched into motoring forward or in reverse in order to reach and hold a certain angular position of the rotor, with or without load engaged), axial translation (when the machine is switched into motoring mode along the axial direction without the rotor spinning), helicoidal motion (when the machine is switched into motoring mode along the axial direction with the rotor spinning), etc.

The matrix machines can be built for a wide range of power ratings. The low power machines (with a power rating under 1 hp), having smaller radial size, can be built with fewer active elements, being suited for lower torque and higher speeds. By contrast, the higher power machines can be built predominantly for higher torque and lower speed.

DETAILED DESCRIPTION

The matrix machine presented here can be operated randomly in either motoring or generation mode simply by selecting the appropriate scanning algorithm. As shown previously, the essential difference between the motoring and generation modes of operation consists in the sign of inductance slope during the activity of the generic stator-rotor pole pair. If the inductance slope is positive, the machine works in motoring mode. Conversely, if the inductance slope is negative, the machine works in generation mode. The scanning algorithms for the motoring and generation modes are similar, but not identical. For this reason, the logic unit needs a non-volatile random access memory module (shown in the block diagram in FIG. 13) to store the various scanning algorithms for each specific operation mode.

The active elements of the matrix machine can be operated independently (in which case each active element is connected to a separate power converter output), or can be grouped in sub-matrices (each sub-matrix is connected to a separate power converter output). In many practical applications, grouping the active elements in several sub-matrices is preferred, since it will minimize the number of connections between the machine and the power converter. For this reason, the subsequent analysis will take into consideration the general case of a machine matrix comprised of a certain number of sub-matrices. Due to their discrete mode of operation, the active elements of the matrix machine will work in time cycles. One time cycle is comprised of a time segment in which the active element is switched ON, followed by a time segment in which the active element is switched OFF (as illustrated in FIG. 5K). The ratio between the OFF time and ON time is always an integer equal to the number of machine sub-matrices. In order to ensure the right functional conditions for all stator-rotor pole pairs during a full cycle, the matrix elements have to be analyzed in the context of the practical limitations under which a real machine can be built with the technology available today.

The currently available technology allows relatively simple construction of machines on rotary topology by assembling together stacks of laminates cut out from silicon steel sheets using various methods (punching, water-jet cutting, laser cutting, electro-erosion, etc.). Given the widespread use of laminates in building machine cores (stators and rotors) with very good cylindrical symmetry, the matrix machine description will be centered around the use of active elements that can be built based on this technology. In this context, the stator-rotor pole pairs will be obtained by assembling a certain number of identical laminates of a well-defined shape. A finished stack of laminates will contain all the stator poles equally spaced along the circumference of the stack. The stator poles will share a common magnetic path (the stator back path), therefore they will be able to interact magnetically. The extent of this interaction will be determined by the manner in which the windings located on the stator poles are activated by the power converter. The rotor poles are obtained in similar fashion; therefore they, too, will share a common back path (the rotor back path) and will be able to interact magnetically. Both the stator and the rotor laminate stacks (shown in FIG. 14 and FIG. 17, respectively) will be built in such a way as to have the stator poles facing the rotor poles. One stator stack paired with a rotor stack will yield a one-row machine matrix, which is one-dimensional. To obtain a bi-dimensional matrix, several stator-rotor paired stacks are assembled together in such a way as to form a cylindrical matrix. In general, the paired stacks will be separated from each other on the axial direction by non-magnetic rings, so they will not be able to interact magnetically (FIG. 15 and FIG. 18 show stator and rotor rows featuring axial separation rings). The assembling of the stack pairs is done by connecting together the stator stacks as one cylindrical matrix and the rotor stacks as another cylindrical matrix. The analysis of the resulting machine cylindrical matrix can be made easier by cutting the matrix along a split line coinciding with a cylinder generator and rolling it flat in one plane (planar projection), as illustrated in FIG. 4.

The matrix machine built with the stator and rotor pole pairs assembled as shown above will consequently be comprised of two distinct physical matrices: a stator matrix (shown in FIG. 16) and a rotor matrix (shown in FIG. 19). In the present analysis, the stator matrix is considered fixed with respect to the chosen system of coordinates, while the rotor matrix can rotate or translate with respect to the axial direction chosen in this system of coordinates. These two matrices are assembled coaxially, so that the poles of each stator stack can be aligned radially and axially with the poles of the corresponding rotor stack (as can be inferred from FIG. 20). The rotor matrix is held in coaxial alignment with the stator matrix by a few brackets, a set of bearings (either mechanical or magnetic type) and a fixed or sliding rotor shaft, which will ensure a constant air gap between the stator and rotor poles facing each other. As stated previously, this arrangement allows up to two degrees of freedom for the rotor matrix: axial (sliding) motion along the rotation axis (when a sliding rotor shaft is used), and rotational (spinning) motion around the same axis, as shown schematically in FIG. 12. The rotational motion is easy to obtain (as illustrated schematically in FIG. 6), being the only motion exhibited by the electric machines currently in use. The axial motion of a stand-alone rotary machine, however, is a novelty and it is worth noting that it represents a special feature of the matrix machine only (an illustration of axial motion matrix is shown schematically in FIG. 11). There is no known stand-alone rotary electric machine performing this kind of dual motion without the use of additional parts or devices. The underlying principle for performing these two types of motion is the same, both types being the result of a sequential soft magnetic attraction between rotor poles and stator poles when the proper scanning algorithm is used. In the machines built on a cylindrical matrix that allows both types of motion (shown in FIG. 12), the generic motoring mode is complemented by compound modes, such as helicoidal motion (roto-translation), when both rotation and translation motion of the rotor matrix are used simultaneously, or cyclical motion, when translation and rotation motion of the rotor matrix are used alternately. These kinds of complex motion could be of special interest in robotics.

In most practical applications, the axial (sliding) motion will be limited to a relatively narrow range, since it may require additional stator and/or rotor poles to be embedded in the machine matrix. Minimization of the number of such additional poles will therefore set a limit to the range of axial motion, unless this range of motion is one of the main goals of certain machine designs. It is worth noting that, in the dual motion machines, the stator and rotor matrices may no longer have the same number of stacks and their relative position on the axial direction may vary, as illustrated in FIG. 12. Nevertheless, the principle of operation will be the same for both axial and tangential directions.

One of the main goals of this invention is to obtain a machine with very high energy efficiency, especially in motoring mode. To reach this goal, besides the usual precautions taken at the design stage (such as choosing the correct magnetic materials, the right magnet wire specs or the proper bearings), the generic stator-rotor pole pair of the machine must be appropriately calculated as to ensure total recovery of the magnetic energy accumulated in the air gap via reverse stator current at the end of each current pulse applied to the stator windings (when the current is switched OFF). In the machines based on the soft magnetic attraction principle, the production of mechanical torque is always accompanied by the accumulation of magnetic energy in the air gap. This energy cannot be used for any useful purpose. Moreover, it cannot be carried over to the next current cycle (when the current is switched OFF, the magnetic energy can no longer be sustained in the air gap and has to "vanish" from this region). If the magnetic energy in the air gap is not removed from the machine via a reverse current, it will be dissipated mostly as heat in the machine. Therefore, in order to minimize energy waste in motoring mode, the magnetic energy must be recovered (i.e., removed from the air gap and sent back to the power supply) without incurring magnetic braking of the rotor. The recovery of this energy can be done by using power drivers featuring reverse current paths, which will be opened automatically when the current pulses in the coils are switched off (as shown in FIG. 9, where the reverse current paths are through diodes D1 and D2). A full recovery must be obtained at all rotational speeds for which the machine is designated to operate. At full power rating, the time required for magnetic energy recovery is proportional to the maximum stator winding inductance and to the voltage of the power supply. For a given machine, the maximum inductance is set by design at a fixed value (the maximum value attainable for any specific pole configuration), so the recovery time results as a function of the power supply voltage. When external constraints require this voltage to match a given value, the recovery time will result as a fixed constant. At low rotational speeds, the recovery task is relatively easy to accomplish, since the recovery time is much smaller than the cycle time. However, at high rotational speeds it becomes increasingly difficult to recover all the magnetic energy from the air gap due to the reduced time cycle. Since the recovery time is constant, the ON time of the current pulse will be squeezed to increasingly shorter values, until it becomes comparable to the recovery time. A limit will be reached at the maximum rotational speed, where the time cycle will be dominated by the recovery time (during which no mechanical energy is being generated). At this point, the only solution to maintain enough ON time for the current pulse is to increase the overlap between the stator and rotor poles in their position of full alignment (by increasing the rotor pole size in the tangential direction). However, there is a superior limit for this overlap (which sets a boundary condition) that is reached when the rotor pole size in the tangential direction is the mirror image of the stator pole size in the same direction (shown in FIG. 5L). Further increase of the overlap over this limit would generate magnetic braking of the rotor, which must always be avoided. Consequently, this limit is a key feature of the matrix machine, which imposes a net limitation on the design of the generic stator-rotor pole pair in order to prevent the reduction of the required ON time on the current pulse and avoid magnetic braking. Such limitation leads to the boundary condition that correlates the maximum rotational speed with the ratio between the stator and rotor pole size in the tangential direction. This can be called "overlap ratio" and is a sub-unity number (in the matrix machine, the rotor size is always greater than the stator size). For a given rotational speed, the overlap ratio gives a time duration for which the rotor poles move with respect to the stator poles and still remain in full alignment with them. During this motion, the stator inductance does not vary (this is illustrated in FIG. 5M, where the inductance value is $L_M$), therefore no mechanical energy is produced by the machine. Such condition allows the magnetic energy to be recovered from the air gap without incurring magnetic braking on the rotor. When the maximum rotational speed is specified, the overlap ratio results unequivocally from the boundary condition, so it will be uniquely determined (it results as a calculation, not as an arbitrary value selection by the designer). Due to the possibility to arrange the poles of the same phase as a matrix row, the matrix machine allows unlimited flexibility in choosing the value of the overlap ratio between the maximum value of 1 (when the stator pole width is equal to the rotor pole width) to the minimum value set by the boundary condition (which is equal to the inverse value of the number of machine phases). FIG. 5M illustrates the shape of spatial inductance variation for various values of the overlap ratio: the negative inductance slope can be shifted left or right at the design stage as a result of varying the overlap ratio. The leftmost position of the negative inductance slope corresponds to an overlap ration equal to 1, while the rightmost position of the negative inductance slope corresponds to an overlap ration equal to $\frac{1}{4}=0.25$ (which is the inverse value of the number of phases in a 4-phase machine). In practice, for a given power supply voltage, a high overlap ratio is used for low speed machines, while a small overlap ratio is reserved for high speed machines. Conversely, for a given maximum speed, a high overlap ratio is used for machines fed by high voltage power supplies, while a small overlap ratio is reserved for machines fed by low voltage power supplies. Consequently, the matrix machine allows a wide range of design options in order to adapt to the available power supplies for any value required for the maximum rotational speed without affecting the power rating of the built machine.

The boundary condition sets the defining difference between a stand-alone machine and a system of machines, since a system of machines will not be optimized based on a boundary condition calculation (which could be met only by sheer luck), so its rotational speed will be limited to a much narrower operational range at the nominal output power. In order to allow the magnetic energy recovery, the power converter of a matrix machine must be endowed with recovery circuitry which provides paths for the reverse stator current. This reverse current carries the magnetic energy stored in the air gap back to the electrical energy source (such as a DC battery or buffer capacitors) at the end of every current cycle, thus precluding the waste of energy in the machine (usually dissipated as heat) and increasing the energy efficiency of the machine in motoring mode. For machines operating at very high rotational speeds, the overlap ratio has to be proportionally small, which results in a generic pole pair with significantly greater rotor pole size compared to the stator pole size in the tangential direction (in the diagrams in FIG. 5A through 5D, the stator and rotor pole size have an overlap ratio of 0.5). Such design affords maximum energy efficiency of the matrix machine by ensuring total recovery of the magnetic energy in motoring mode.

In certain applications, especially under tight space limitations, the basic matrix machine can be subdivided in a number of physically distinct parts, which could be located wide apart from each other without breaking the functional cohesion of the original machine. FIG. 10 illustrates the division of a machine matrix in two co-dependent sub-matrices. This structural divisibility is another key feature of the matrix machine, which allows a machine to be "distributed" axially within a given spatial expansion in order to meet various space limitations. To obtain several machine sections that can work identically as the original machine, the stator and rotor matrices of the original machine can be cut along several planes perpendicular to the rotation axis. These planes must be chosen in the narrow regions where the stator and rotor stacks are joined together in the original matrices. In planar projection, the cutting plane is represented by a division line (shown in FIG. 10A). In this way, the resulting sections will contain whole stator and rotor stacks (the cut will never be done through the middle of the stacks). Each of such sections is a sub-matrix, which is a sub-set of the original matrix. A sub-matrix can contain one or more stacks. Further cutting of a sub-matrix into smaller sub-matrices is possible as long as the original sub-matrix is comprised of at least two stacks. Therefore, a matrix machine can be subdivided structurally into as many sub-matrices as desired, until all sub-matrices are comprised of a single stack. The essential condition for the sub-matrices to work exactly as the original machine matrix is to be linked mechanically through a common rotor shaft. This condition is equivalent to enforcing that all sub-matrices belong to the same matrix (which is the original machine matrix).

Particulars of the Invention and Practical Considerations

Building a real matrix machine for a given purpose entails prior acquisition of the theoretical foundation of its principle of operation. The complete theory of operation developed by the authors of this invention for the generic matrix machine is the topic of a separate technical publication, but the essential aspects required to understand the invention are presented in this description. This theory is derived from first principles (such as the principle of conservation of energy/momentum and the law of entropy) and takes a significantly different approach in establishing the phenomenology of the generation mode compared to that found in existing publications. The phenomenology of the motoring mode is well presented in the existing literature dedicated to the SRMs, albeit in a fragmentary fashion and without correlating the aspects common to the motoring and generation modes. However, an overarching exposition on the whole phenomenology of a generic machine based on the principle of soft magnetic attraction is still lacking. The authors of this invention believe they have filled a longstanding gap in this area by providing a coherent theory of operation of matrix machines based on generic stator-rotor pole pairs, which is valid for any machine based on the principle of soft magnetic attraction (SRMs included). Moreover, this theory is further refined by treating the generic pole pair as an active element producing a discreet constant action (the constant tangential or axial magnetic force), which allows the use of digital modeling for the machine matrix. It is worth noting that the theory of operation covers not only the linear zone of core magnetization, but it is extended into the non-linear (saturated) zone as well. In this zone, it has been found that the generation of magnetic force departs from the quadratic dependence on the current pulse amplitude and becomes almost linear with the current pulse amplitude. Also, the conditions to be met in order to operate the machine solely in the linear zone are clearly established (the magnetic saturation point for a given design has been shown to be dependent on the radial size of the air gap between the stator and rotor poles).

Based on the theory mentioned above, a practical matrix machine can be built as a plurality of stator-rotor pole pairs organized as a generic cylindrical matrix. This matrix is comprised of two physical matrices, the stator (fixed) matrix and the rotor (mobile) matrix. The stator matrix contains salient stator poles and can be built from stacks of laminates assembled together. The stacks are fitted with windings on each stator pole, which are concentrated coils made of magnet wire (usually enamel-insulated copper wires wound in a few layers). The coils of adjacent poles are fed with electric current pulses circulated in alternating directions. In this way, any coil will develop a magnetic flux in its core (stator pole) flowing in one direction, while the two adjacent coils will develop a magnetic flux flowing in the opposite direction (as shown in FIG. 1B). The superposition of these fluxes on the return paths (which run through the neighboring cores) leads to the addition of the flux flow in all cores. At this point, it is important to emphasize that the stator stack can be fitted with windings only on half of its poles, without changing the functionality of the resulting machine. To achieve this, a coil will be placed on every other pole, so that the coils are evenly distributed on the circumference of the stator stack. In this case, the coils can be bigger, since they can fill a slot that is twice as big compared to the case where every stator pole has its own coil. The only difference in the coil connectivity consists in the condition that all the coils must be fed with electric current pulses circulated in the same direction, so that the magnetic flux generated by each coil will have a return path through the adjacent stator poles without coils on them. The flux circulation will be identical in both configurations, therefore there will be no difference in machine operation related to the way the coils are utilized. In practice, the configuration with a coil mounted on every stator pole will be preferred in cases where the compactness of the resulting machine is important, since the coils will be smaller in size and the axial expansion of the machine can be made smaller. The rotor matrix can be built similarly as the stator matrix, the difference being the absence of the coils and the smaller radial extension of the salient poles. The stator flux paths will be closed through the rotor poles via the air gap during operation, as illustrated in FIG. 1B.

From the construction of the generic pole pair shown above, it is evident that the stator-rotor pole pairs are actually soft electromagnets (since no permanent magnets are used). In fully aligned positions of the generic pole pair, the generic electromagnet is equivalent to a closed magnetic circuit featuring a small air gap and fed by electric current pulses via the coil. In this position, the inductance of the coil has a maximum value $L_M$. In fully unaligned positions, the generic electromagnet is equivalent to a closed magnetic circuit featuring a big air gap and fed by electric current pulses via the coil. In this position, the inductance of the coil has a minimum value $L_m$. The operation of the machine is based entirely on the cycling of the inductance of the generic electromagnet between the positions of minimum and maximum value as the rotor matrix moves the rotor poles (clockwise or counter-clockwise) with respect to the stator poles. When the electric current pulses are applied while the stator coil inductance is increasing, the matrix machine works in motoring mode (transforming electrical energy into mechanical energy). When the electric current pulses are applied while the stator coil inductance is decreasing, the matrix machine works in generation mode (transforming mechanical energy into electrical energy). If the electric pulses are applied when the stator coil inductance remains constant at value $L_M$ (which occurs when the moving rotor poles remain in full alignment with the stator poles due to a small overlap ratio), the machine cannot transform energy from one form to another. This region is used to recover the magnetic energy from the machine (stored as magnetic energy in the air gap) and send it back to the power supply via reverse stator current without incurring magnetic braking (which would reduce the output mechanical power).

In principle, the energy efficiency of a matrix machine is very high, especially in motoring mode (where it matters most), since there is no mechanism allowed to divert the input electrical energy into other uses than the production of mechanical torque impressed on the rotor. During operation in motoring mode, the energy drawn from the power supply is partially transformed into mechanical energy available to the load and partially accumulated as magnetic energy in the air gap. At the end of each discrete action, the magnetic energy stored in the air gap is recovered and sent back to the power supply via reverse current. In this way, no energy is wasted in the machine by means of a parasitic mechanism that diverts some of the input energy into a useless form of energy that cannot be recovered. However, according to the second law of thermodynamics, in the real world there is no process that can be carried out with perfect efficiency, so the matrix machine will indeed waste small amounts of energy during operation. A part of the waste energy is dissipated as heat in the coils due to the electrical resistance of the magnet wire when the current pulses are applied (resistive losses). Another part is dissipated as heat in the magnetic core due to magnetization (hysteresis losses) and induction (eddy current losses) when the electric current pulses in the coils are switched on and off at high frequency (core losses). The magnitude of the core losses is proportional to the volume of the magnetic paths. Since the matrix machine uses exclusively the energy-efficient short path for all stator-rotor pole pairs, the core losses are minimized by design. Yet another part is dissipated as heat in the bearings due to the mechanical friction between their moving parts, especially at high rotational speeds (friction losses). By carefully designing the main parts of the machine (such as the pole geometry, the electrical coil, the power converter circuitry, etc.) and by choosing magnetic materials with high permeability and high saturation flux density, these losses can be minimized drastically.

The advantages of the matrix machine over the existing machines built on the soft magnetic attraction principle (such as the SRM) are truly remarkable. While the matrix machine can claim the same general benefits presented in the description of the prior art (such as simple rotor construction which offers high reliability in operation at high rotational speeds, high starting torque, high energy density and relatively inexpensive manufacturing), it also has unique features which makes it revolutionary in the field of electric machines. One of these features consists in the total independence between the machine phases when these phases are built as separate rows on the cylindrical machine matrix. This compares very favorably to the SRMs, which have typically up to 15% mutual flux linkages between phases (this being a drawback for these machines). Such magnetic independence confers the matrix machine the benefit of unconditional fault tolerance in operation in the event of one or more machine rows failure. Another unique feature consists in the structural divisibility of the matrix machine, which allows a machine to be "distributed" axially within a given spatial expansion in order to meet various space limitations. This feature is not found in any other type of electric machine. The other unique features are related to the special characteristics afforded by the cylindrical matrix. One of them consists in the versatility of employing a number of active elements as high as necessary without increasing the diameter of the machine. When this diameter is limited by end-user constraints, the axial size of the matrix can be increased to allow the growth of the number of active elements to the required amount. A SRM cannot do this, so it will always be limited to the number of poles allowed by the maximum machine diameter. As shown previously, the higher the number of active elements, the lower the rotational speed of the machine and the higher the mechanical torque generated by a matrix machine. This leads to one of the most unique features of this machine: the built-in gear reduction function. In many applications, a low-speed high-torque motor is required, while the existing motors exhibit usually high speed and low torque for a given power rating, which requires a gearbox to reduce the speed and augment the torque. The matrix machine can generate natively the necessary low speed and high torque for these applications by employing a high number of active elements in its matrix. Another special feature consists in the extreme versatility of the stator-rotor pole overlap ratio, which can be varied at will between unity and the extreme low value set by the boundary condition. For a matrix machine with 4 rows, for instance, the extreme value of the overlap ratio is $\frac{1}{4}$=0.25. An overlap ratio of 0.25 cannot be entertained in the existing SRMs, due to the drastic decrease of the power rating that would ensue. By contrast, a matrix machine with such value of overlap ratio can be operated at extremely high speeds without affecting the power rating. Finally, the digital-like mode of operation, made possible by the use of constant discrete actions allowed by the matrix structure, is another exquisite feature, which enables a totally new kind of analysis and design for the machines based on the soft magnetic attraction.

BRIEF DESCRIPTION OF THE DRAWINGS

FIG. 3 shows the method of obtaining a cylindrical matrix from a planar matrix (direct topology in FIG. 3A and reverse topology in FIG. 3B).

FIG. 19 shows the structure of a complete bi-dimensional rotor matrix with 3 rotor rows and 24 columns.

FIG. 20 is an isometric view of an assembled bi-dimensional matrix with 3 rows and 24 columns, built on reverse topology (rotor outside).

FIG. 21 is an isometric exploded view of a bi-dimensional matrix with 3 rows and 24 columns, viewed from the rotor bracket side.

DETAILED DESCRIPTION OF THE DRAWINGS

Figure 1:
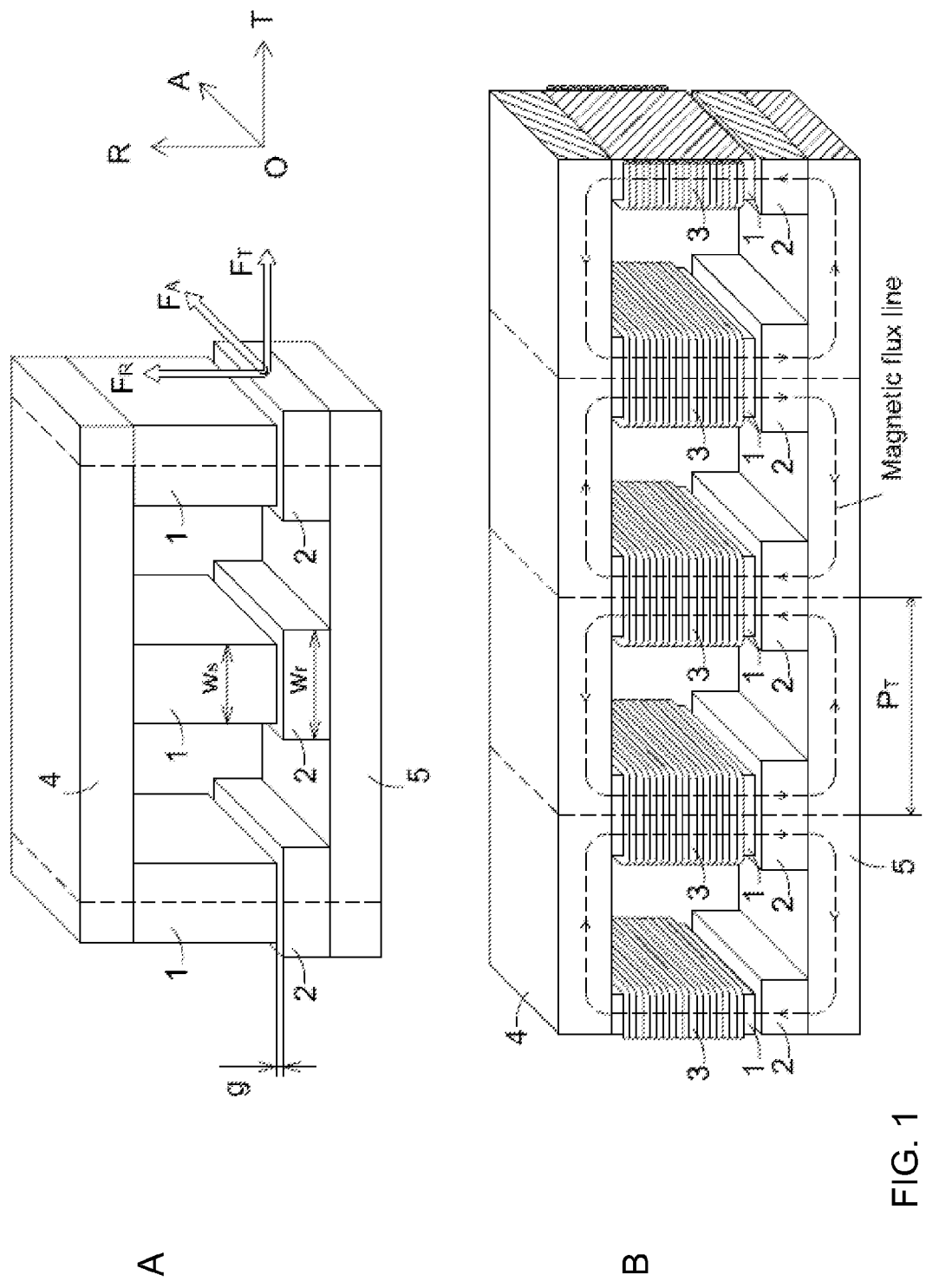
FIG. 1A shows the magnetic path structure of an active element (stator-rotor pole pair), in isometric view.
FIG. 1B shows a segment of a matrix row depicting the magnetic flux flow produced by the stator coils, in isometric view.

FIG. 1A represents the structure of a generic active element of the machine matrix, comprised of a pair of stator and rotor poles and their relationship with adjacent pairs. Due to the difficulty of cylindrical representation, the active element is presented in isometric view. The axes of the Cartesian system of coordinates are chosen to correspond to the original cylindrical system of coordinates as follows: radial coordinate OR, axial coordinate OA and tangential coordinate OT. In this system of coordinates, the stator pole 1 is a parallelepiped-shaped soft magnetic piece with tangential dimension (width) $w_s$, mounted on a soft magnetic stator back path 4. Similarly, the rotor pole 2 is a parallelepiped-shaped soft magnetic piece with tangential dimension (width) $w_r$, mounted on a soft magnetic rotor back path 5. Usually, the axial dimension of the stator and rotor poles is the same, but this is not a hard rule. The relationship between the stator width $w_s$ and the rotor width $w_r$ is always $w_r > w_s$, meaning the tangential size of the stator pole is smaller than the tangential size of the rotor pole. The ratio $w_s/w_r$ is the overlap ratio referenced in the machine description. The stator and rotor poles are positioned to face each other in the axial-tangential plane. A small air gap of length g (measured in the radial direction) separates the faces of the stator and rotor poles. In this system of coordinates, the stator pole is fixed, while the rotor pole can move (slide) along the tangential direction or along the axial direction in either positive or negative direction, on condition to keep the radial length of the air gap g constant at all times.

FIG. 1B represents a short segment of a matrix row, shown in isometric view. It shows how a linear array of stator and rotor poles can be obtained by placing a certain number of stator and rotor poles on their respective back paths. The stator poles 1 are arranged with equal spacing on stator back path 4 and each stator pole holds an electrical coil 3. Similarly, the rotor poles 2 are arranged with equal spacing on rotor back path 5. As can be seen in FIG. 1A, one stator pole, one rotor pole, the adjacent portions of the stator and rotor back paths, and half of the neighboring stator and rotor poles form a closed magnetic circuit with two branches. In FIG. 1B, each of these branches is shown between two dashed lines drawn along the radial coordinate. The coils 3 are placed on the stator poles 1, therefore a coil is always common to two adjacent branches. The magnetic circuit of every branch has a total air gap of length 2g, therefore a magnetic flux produced in this circuit by a coil 3 will be limited in magnitude by the reluctance introduced by this air gap. The magnetic flux will generate magnetic forces at all locations where the strength of the magnetic field is significant. Since the magnetic circuits are made of soft magnetic materials with high magnetic permeability, the only location with significant magnetic field strength will be the air gap. In such case, the magnetic forces produced in the air gap will have components along the radial, axial and tangential axes. The radial component of the magnetic force is $F_R$, which tends to attract the rotor poles radially towards the stator poles. The result of this motion would be the reduction of the air gap g, which is assumed to be constant. Therefore, in order to maintain a constant air gap between the stator and rotor poles, the radial force $F_R$ must be cancelled via design features. The tangential component of the magnetic force is $F_T$, which tends to move the rotor poles along the tangential direction. This force occurs only when the stator and rotor poles are partially aligned along the tangential direction and always causes the rotor poles to move in the direction or greater alignment with the stator poles. When the stator and rotor poles are fully aligned, the tangential force is no longer produced (its magnitude becomes zero). The axial component of the magnetic force is $F_A$, which tends to move the rotor poles along the axial direction. This force occurs only when the stator and rotor poles are partially aligned along the axial direction and always causes the rotor poles to move in the direction or greater alignment with the stator poles. When the stator and rotor poles are fully aligned, the axial force is no longer produced (its magnitude also becomes zero). In the existing machines based on the soft magnetic attraction principle, only the tangential force is exploited. By contrast, the matrix machine is the only machine that can exploit both the tangential and the axial magnetic forces at the same time. The magnetic flux that generates the magnetic forces is produced by injecting electric current pulses in the electrical coils 3, which are generally made of magnet wire. The coils are identical and are calculated to yield magnetomotive forces in the aligned magnetic circuit of such magnitude as to reach the magnetic saturation knee when the current pulse has maximum amplitude. FIG. 1B shows the rotor poles in the position of full alignment with the stator poles. The magnetic flux lines produced in each stator-rotor pole pair can have either upward or downward direction in the pole pair (along the radial direction). The coils are connected in such a way as to produce magnetic fluxes with alternating upward-downward directions in the pole pairs. In this way, the magnetic fluxes of adjacent pole pairs will reinforce each other and the maximum flux density is obtained in the pole pairs (otherwise, the fluxes would cancel each other out). Since the fluxes in adjacent pole pairs must have alternate directions, the number of pole pairs will necessarily be an even number. In practice, the totality of stator poles 1 arranged with equal spacing on stator back path 4 comprise a congruous physical part (the stator stack) which, together with the coils 3, constitutes the core of a stator row. Similarly, the totality of rotor poles 2 arranged with equal spacing on rotor back path 5 comprise a congruous physical part, which constitutes the core of a rotor row. The stator row and the rotor row have the same number of poles (which was shown to be even). Moreover, the tangential spacing between the centers of adjacent poles is the same for both the stator and the rotor row. This spacing is denoted by $P_T$ in FIG. 1B and is a machine matrix constant called "tangential pole pitch".

Figure 2:
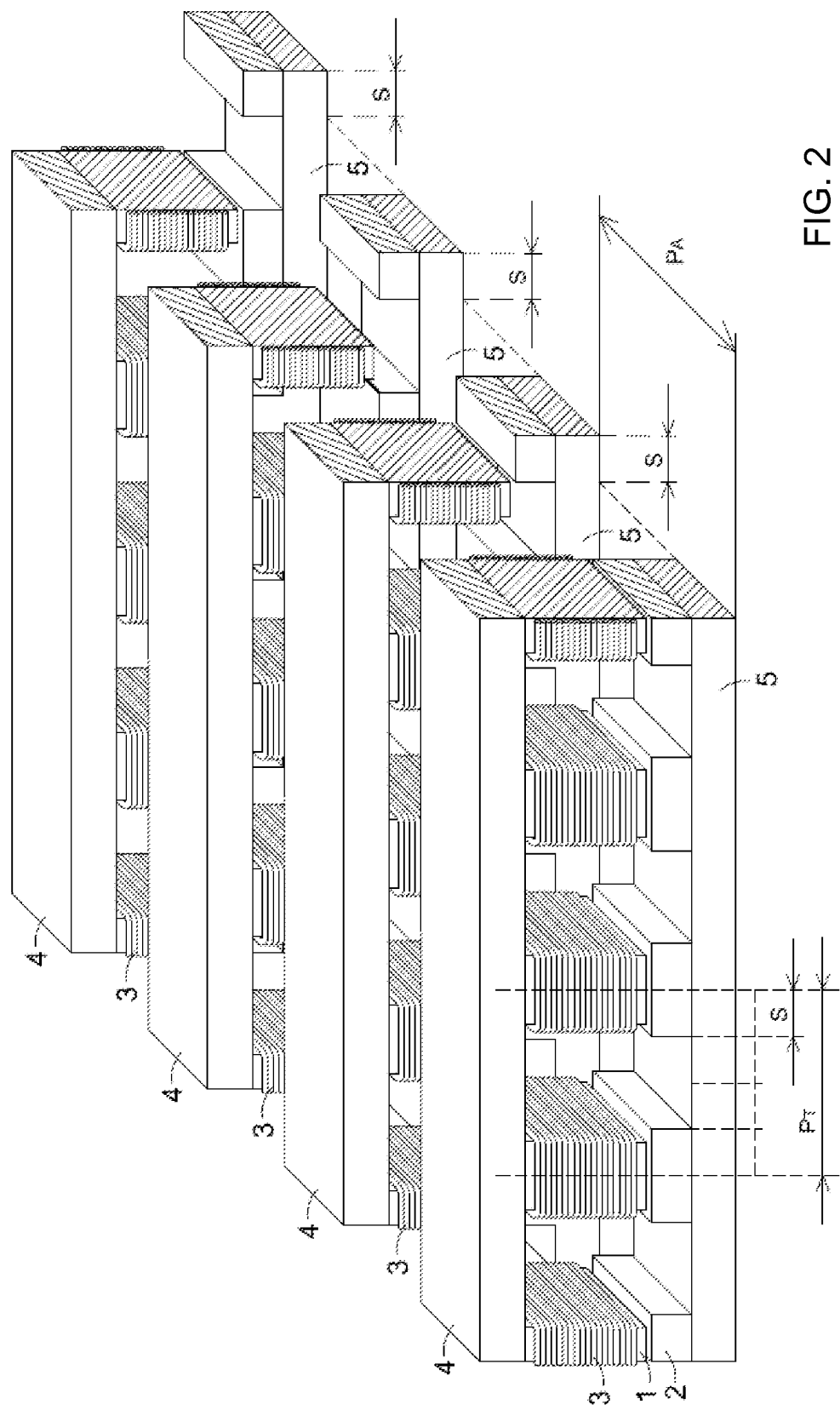
FIG. 2 shows a portion of a specific bi-dimensional matrix with 4 rows, in isometric view.

FIG. 2 represents a section of a specific bi-dimensional matrix with 4 rows, shown in isometric view. This figure illustrates the principle of matrix organization of stator-rotor pole pairs in order to create a bi-dimensional machine matrix. The stator back paths 4 holding the stator poles 1 (each fitted with a coil 3) are arranged parallel to each other in order to form a bi-dimensional array of poles in the axial-tangential plane. Because the stator rows are rigidly assembled together on a common support, this array constitutes a physical stator matrix. Since the poles of all stator rows are fully aligned in the axial direction, they are arranged on a grid with rectangular cells (stator grid). The rotor back paths 5 holding the rotor poles 2 are also arranged parallel to each other in order to form a bi-dimensional array of poles in the axial-tangential plane. However, unlike the poles of the stator rows, the poles of the rotor rows are not aligned in the axial direction. Each subsequent rotor row is shifted in the tangential direction by a quantity S with respect to the previous rotor row. The spacing between two adjacent stator rows is equal to the spacing between two adjacent rotor rows and constitutes a matrix parameter $P_A$ called "axial pole pitch". In the matrix machines designated for rotational motion only, the quantity S is called "tangential grid pitch" and is calculated by formula $S=P_T/N$, where N is the number of rotor rows. The rotor poles are rigidly assembled together via a common support on this grid (rotor grid) and constitute a physical rotor matrix. Consequently, the stator grid and the rotor grid have the same axial cell size. However, since the rotor grid has a tangential cell size that is N times smaller than that of the stator grid, this grid will be N times denser in the tangential direction compared to the stator grid. In other words, the stator grid is a subset of the rotor grid. This is the reason why the rotor grid is taken as the basis for the creation of the machine matrix.

FIG. 3 shows the method of obtaining a cylindrical matrix out of a planar matrix. This method is used when a planar matrix is readily available to design a matrix machine based on planar matrix calculus. The cylindrical matrix is shown projected in a plane perpendicular to the cylinder axis, which corresponds to the radial-tangential plane of the planar matrix. To obtain a cylindrical matrix, the stator back paths 4 and the rotor back paths 5 are warped congruently in the tangential direction in order to create circular (rotary) rows. The circular rows maintain the same constant air gap between the stator poles 1 and rotor poles 2, as in the original planar matrix. The matrix shown in FIG. 3A is obtained by warping the stator and rotor rows toward the rotor side. The result is a cylindrical matrix with the rotor inside, which is the default topology for rotary machines. The matrix shown in FIG. 3B is obtained by warping the stator and rotor rows toward the stator side. The result is a cylindrical matrix with the rotor outside, which is the reverse topology for rotary machines. The shape of stator coils 3 is not affected significantly by the warping direction. However, the shape of the stator and rotor poles may be altered from the original parallelepiped to a trapezoidal prism in order to optimize their magnetic properties near the saturation zone. It is worth noting that the warping of individual stator and rotor rows can be done in the axial direction also, which would result in round stator and rotor rows that are no longer concentric but parallel to each other. Joining several such stator and rotor rows would result in a matrix machine with axial field in the air gap. However, the axial field matrix machine will not be treated in this presentation.

Figure 4:
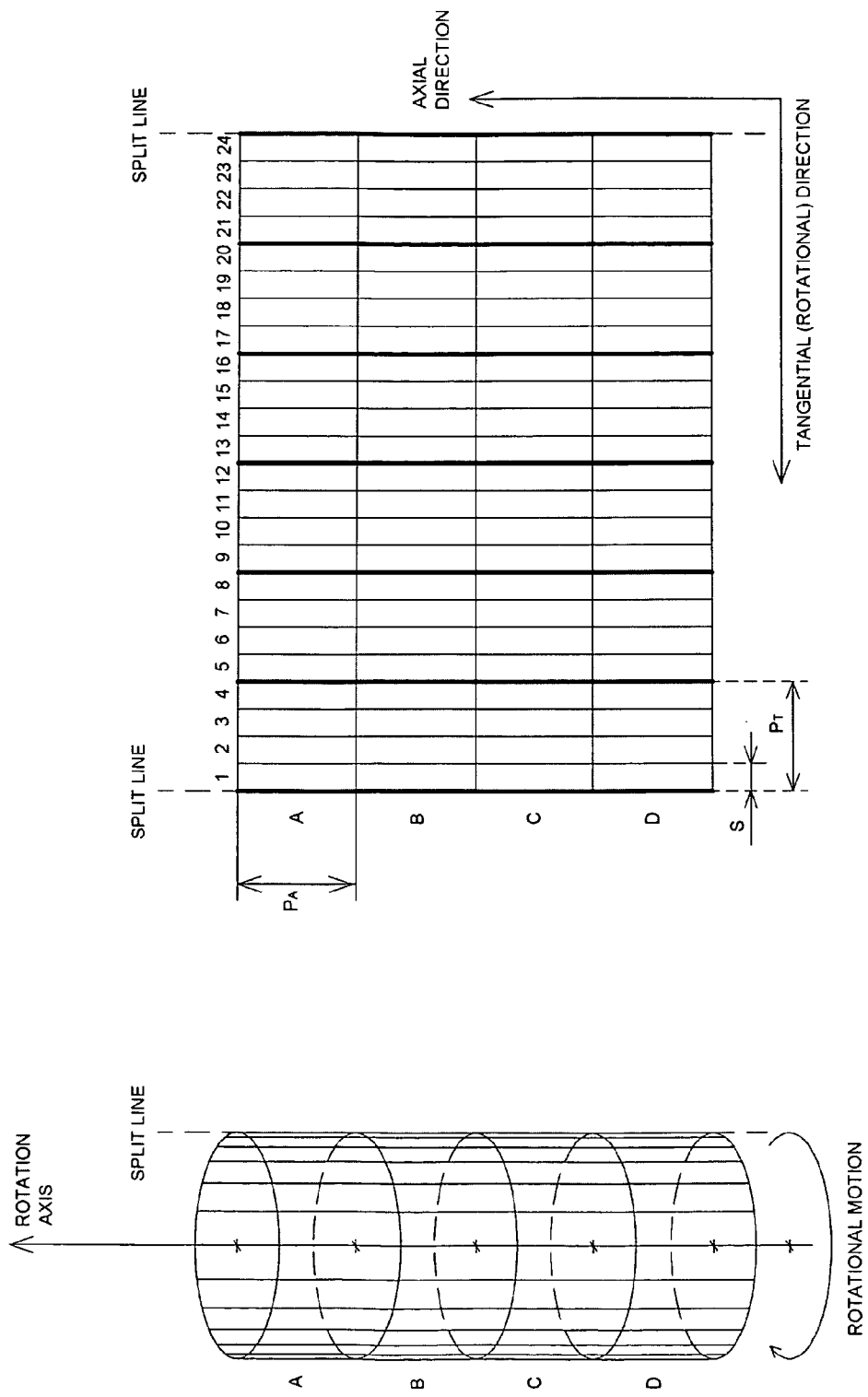
FIG. 4 shows a schematic representation of a cylindrical matrix with 4 rows and 6 columns (FIG. 4A) and its equivalent planar projection (FIG. 4B).

FIG. 4 illustrates the method of obtaining a planar matrix out of a cylindrical matrix (in this case, a matrix with 4 rows and 6 active elements per row, as shown in FIG. 4A). This method is used when a matrix machine needs to be analyzed using the planar matrix calculus. In order to obtain a planar representation, the cylindrical matrix is cut along a split line (which must coincide with a cylinder generator) and unfolded on the axial-tangential plane. In this way, an equivalent planar matrix is obtained (planar projection, shown in FIG. 4B). In the planar matrix, the stator grid has cells with size $P_T \times P_A$, while the rotor grid has cells with size $S \times P_A$. Since the number of rows is N=4, the tangential size of the rotor cell is $S=P_T/4$. Therefore, the rotor grid will have 4 times more cells than the stator grid. If the rows have 6 elements each, the stator grid will have 6×4=24 cells, and the rotor grid will have 4×6×4=96 cells. As shown previously, the denser rotor grid represents the machine matrix grid. The general formula to calculate the total number of cells $C_M$ for a matrix with N rows and n elements per row is $C_M=N^2 \times n$. The number of cells per row $C_R$ will be $C_R=N \times n$. Therefore, the machine matrix will have N rows, $C_R=N \times n$ columns and $C_M=N \times C_R=N \times N \times n=N^2 \times n$ cells. Since each stator cell contains one stator pole, the total number of stator poles is N×n, therefore the number of stator poles is equal to the number of cells per row, $C_R$. Because the stator and rotor poles are paired, the number of rotor poles is the same as the number of stator poles. Consequently, a matrix machine built exclusively for rotational motion will have N×n stator-rotor pole pairs, which represent the active elements of the matrix machine. In order to identify uniquely every active element in the machine matrix, the matrix rows are designated by letters (A, B, C, D) and the matrix columns are designated by numbers (1 through 24) in this presentation.

Figure 5:
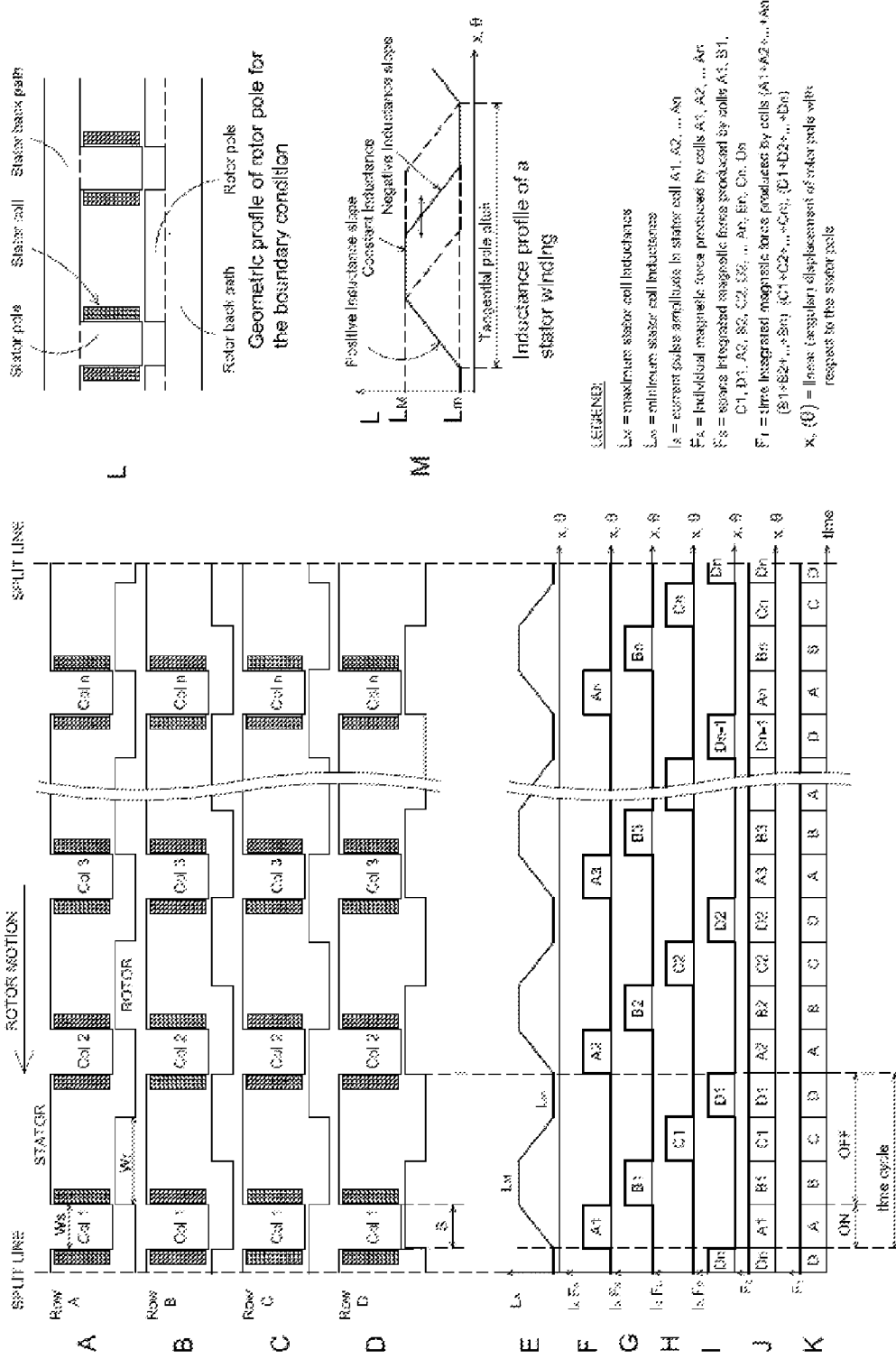
FIG. 5 shows a planar snapshot of a bi-dimensional matrix with 4 rows (FIG. 5A through 5D), a diagrammatic representation of the elementary actions and their space and time integration (FIG. 5E through 5K), the rotor pole geometry for the boundary condition (FIG. 5L) and the space variation of the stator coil inductance (FIG. 5M).

FIG. 5 illustrates the principle of operation of a matrix machine with 4 rows and n active elements per row in motoring mode. The top 4 diagrams (FIG. 5A through 5D) show the planar projection of the stator and rotor poles in the radial-tangential plane. The 4 matrix rows A, B, C and D are shown at a moment in time that coincides with the end of a discrete action and the beginning of another. At that moment, the pole pairs of rows C and D are fully aligned, while the pole pairs of rows A and B are fully unaligned. The fully aligned rows cannot generate discrete actions in motoring mode, so only rows A or B are able to generate such actions, depending on the direction of rotor motion. If the rotor motion is from right to left (referenced as counter-clockwise or reverse motion), as shown in the figure, only row A is able to generate a motoring action. Conversely, if the rotor motion is from left to right (referenced as clockwise or forward motion), only row B is able to generate a motoring action. If a current pulse is injected in the coils of row A (positioned in columns 1 through n), tangential magnetic forces are generated in the air gaps of row A. These forces will move the rotor poles to the left until they become aligned with the stator poles. At the end of this action, the rotor poles of all rows will be shifted to the left by an increment equal to the tangential cell size S. The new position of rows A, B, C and D will coincide with the former positions of rows B, C, D and A, respectively. Mathematically, this constitutes a permutation of the matrix rows. At this point, it is important to note that the tangential cell size S is not the same as the tangential stator pole size $w_s$ or the tangential rotor pole size $w_r$. Rather, the cell size S represents the amount of tangential motion of the rotor periphery during a single discrete action. However, it can be deduced that the tangential stator pole size $w_s$ has to be equal to or greater than the cell size S. The tangential magnetic forces are generated when the inductance of the stator coils is either increasing or decreasing. In FIG. 5E, the variation of the inductance for the coils of row A is represented as a function of the rotor poles position versus the stator poles. This representation is a linear approximation of the real function, which has softer transitions between the oblique and the horizontal slopes of inductance variation due to various factors (such as fringing effects of the magnetic flux in the air gap, anisotropic magnetic material behavior around the air gap zone, etc.). When the rotor poles are fully unaligned, the coil inductance is minimum, $L_m$. As the rotor poles move to the left into alignment, the coil inductance increases linearly to a maximum value $L_M$, reached when the poles are fully aligned. Since the stator pole size in the tangential direction is smaller than the rotor pole size, the rotor poles can move further to the left without exiting alignment. During this motion, the coil inductance remains constant at value $L_M$. When the rotor poles exit the aligned position with the stator poles, the coil inductance starts to decrease, until it reaches again the minimum value $L_m$ at the end of partial alignment. This cycle is repeated as long as the rotor poles move with respect to the stator poles. Since all active elements of the matrix machine are identical, all rows have the same coil inductance variation. On the portions where the coil inductance is increasing, a tangential magnetic force can be produced in motoring mode by injecting a current pulse in the coil in order to spin the rotor. Conversely, on the portions where the coil inductance is decreasing, a tangential magnetic force can be produced by the current pulse, which opposes the motion of the rotor caused by a prime mover. This force can be used to generate reverse stator current, which is the basis of machine operation in generation mode. On the portions where the coil inductance remains constant (as shown in FIG. 5M), no tangential magnetic force can be produced. The portion of constant inductance $L_M$ can be used to recover the magnetic energy accumulated in the air gap without incurring magnetic braking of the rotor, while the portion of constant inductance $L_m$ can be used to recover the magnetic energy accumulated in the air gap in generation mode. This property allows the machine to work at greater power densities with relatively low voltages provided by the power supply, which is a highly sought after feature. In FIG. 5M, it is assumed that the coil inductance variation is linear. Under such assumption, a current pulse of constant amplitude ($I_A$ through $I_D$) injected in the coils will produce a tangential magnetic force of constant amplitude ($F_A$ through $F_D$) in the air gap adjacent to each coil, as shown in FIG. 5F through 5I. The superposition of the elementary actions (magnetic forces) produced by all coils along the direction of motion yields the space-integrated force $F_s$ (shown in FIG. 5J), which has the same amplitude along the rotor circumference. The superposition of the same elementary actions along the time axis yields the sum $F_T$ of these actions in the time domain (time integration, shown in FIG. 5K), which is a continuous (seamless) force of constant amplitude. This is a very important property of the matrix machine in motoring mode, because it generates a smooth motion of the rotor, with very little torque ripple.

Figure 6:
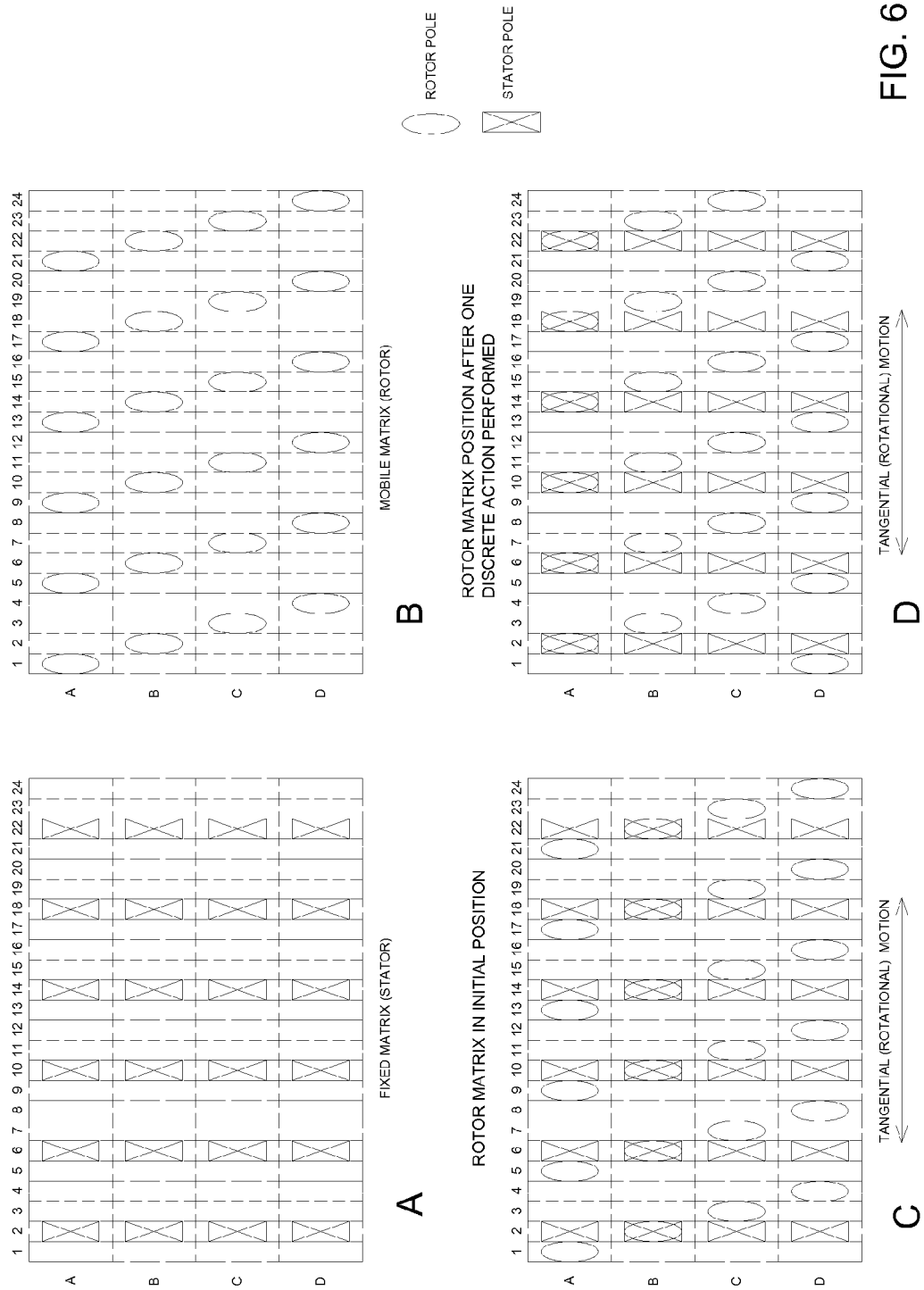
FIG. 6 shows the planar projection of a cylindrical matrix with 4 rows and 6 columns (FIGS. 6A and 6B) showing the positions of the active elements before a discrete action (FIG. 6C) and after a discrete action (FIG. 6D).

FIG. 6 illustrates schematically the arrangement of the active elements of a cylindrical matrix with 4 rows and 6 active elements per row (4×24 elements). In this figure, as well as in the subsequent figures showing such a schematic arrangement of active elements, the stator poles are represented symbolically by a diagonally crossed rectangle, while the rotor poles are represented symbolically by an ellipse, for the purpose of showing their spatial superposition without cluttering the views. In FIG. 6A, the stator poles are shown in their axially aligned positions in the machine matrix. In FIG. 6B, the rotor poles are shown shifted tangentially in each subsequent row. These 2 views depict the algorithm of positioning the stator-rotor pole pairs in designated locations in the machine matrix in order to obtain a working machine. FIG. 6C shows the relative positions of the stator and rotor poles, superimposed on the same matrix, at the start of a discrete action (initial position). If the rotor motion is to the right, then the only row that can produce discrete actions is row A, since it is in an unaligned position and the inductance of its coils will increase during this motion. At the end of the discrete action of row A, the new position of the rotor rows is the one shown in FIG. 6D. It is obvious from these views that the position of the rotor poles after a discrete action is the same position obtained after a permutation of the rotor matrix obtained by shifting all the rows up one step. In this new position, the only row that can produce discrete actions is row D. After the discrete action performed by row D, the newer position of the rotor matrix will allow only row C to produce discrete actions. Therefore, it can be inferred that the correct time sequence of row action will be D, C, B, A. This sequence is recorded as a valid way to scan the matrix elements in order to generate the desired motion and represents the basis of the scanning algorithm in motoring mode. By applying this algorithm to the power converter outputs during operation in motoring mode, it is ensured that all the discrete actions produced by a row (when fed by one of the converter outputs) will allow another row to do the same in its turn, and this sequence of events will continue indefinitely as long as the rotor motion is desired in the original direction. Reversal of the rotor motion will require a different sequence of discrete actions, which in our case will be A, B, C, D. This sequence will be the basis of a different scanning algorithm, which will be used for motoring in reverse direction. In generation mode, the sequences will be different from the sequences used in motoring mode, because in this case the discrete actions are performed when the rotor poles move out of alignment with the stator poles instead of moving into alignment. Consequently, two additional scanning algorithms will be used in generation mode, one for each direction of rotor motion caused by the prime mover.

Figure 7:
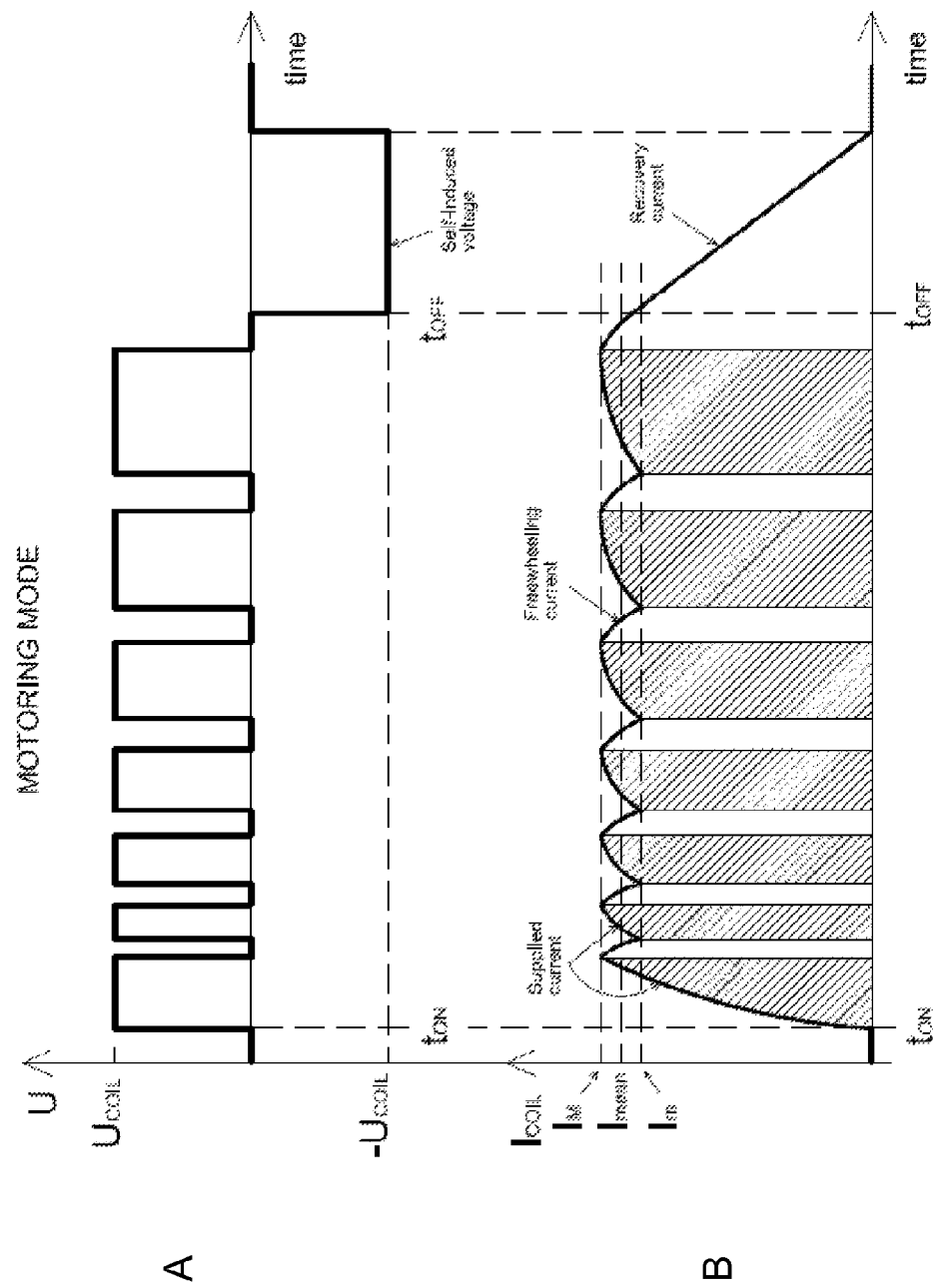
FIG. 7 shows the waveforms of the voltage applied to the coil of an active element (FIG. 7A) and the current circulating in the coil (FIG. 7B) in motoring mode.

FIG. 7 shows the waveforms of the voltage applied to the coil of an active element ($U_{COIL}$) and the current circulating in the coil ($I_{COIL}$) in motoring mode. In order to produce a discrete action, the principle of operation requires injecting a current pulse of constant amplitude in the coil of an active element. As shown previously, the coils are made of magnet wire. Such coils will exhibit two electrical properties: inductance and resistance. The inductance is the property we want to use in the matrix machine, while the resistance is an inherent property of the coil due to the non-zero electrical resistivity of the wire material (usually copper). The standard means to inject a current pulse in a coil is by applying a constant voltage $U_{COIL}$ across the coil terminals. However, a constant voltage across a coil will generate an ever increasing current in the coil. In order to limit the current to the constant value we want, a chopping technique is used. This technique, well described in literature, employs a current sensing element which monitors the current value in the coil. The current pulse needs to be applied between moments $t_{ON}$ and $t_{OFF}$, which must coincide with the beginning and the end of the segment of positive inductance slope, respectively. The moments $t_{ON}$ and $t_{OFF}$ are determined by the rotor position sensors and are validated by one of the two scanning algorithms used for the motoring mode (one for motoring forward, the other for motoring in reverse). When the increasing current reaches the maximum value $I_M$ supported by the coil wire, the current is cut off and is allowed to freewheel (circulate in the coil via a freewheeling diode without any external voltage applied to the coil). As a consequence, the current will start to decrease in the coil. During this time, the voltage applied to the coil is close to zero. When the decreasing current reaches value $I_m$, the supplied current is reinstated in the coil, so the voltage applied to the coil becomes again $U_{COIL}$ and the current will start to increase again. Therefore, the current will swing between the $I_m$ and $I_m$ values until it is cut off permanently at the end of the current pulse application ($t_{OFF}$). It is evident that the current pulse does not have a strictly constant value between moments $t_{ON}$ and $t_{OFF}$, but it can be regarded as constant if we consider its mean value $I_{mean}$ (and $I_m$ is close to $I_M$). The waveform of voltage $U_{COIL}$ that is used to produce the current $I_{COIL}$ is shown in FIG. 7A. This voltage is cycling between the nominal value $U_{COIL}$ and a very small negative value, which for all intents and purposes is considered to be zero, driven by the circuitry used in the chopping technique. When the voltage is equal to $U_{COIL}$, the current is injected in the coil by the power supply and is always increasing (the circulation of the injected current is shown in FIG. 9A). In the case presented here, the current increases from zero to $I_M$ at the start of the current pulse and from $I_m$ to $I_M$ during the rest of the pulse. During this time, the machine draws electrical energy from the power supply, which is partially transformed into mechanical energy in the rotor and partially accumulated as magnetic energy in the air gap. When the current is cut off, the voltage across the coil is switched to a negative value close to zero (equal to the forward bias voltage of the freewheeling diode plus the saturation voltage of the open transistor that is used for freewheeling) and the current is freewheeling, decreasing from $I_M$ to $I_m$ during the pulse time. During this time, the machine no longer draws electrical energy from the power supply, instead it converts partially the magnetic energy accumulated in the air gap into mechanical energy in the rotor through the circulation of freewheeling current (the circulation of the freewheeling current is shown in FIG. 9B). At the end of the pulse, the remaining magnetic energy in the air gap is transferred back to the power supply via the reverse (or recovery) stator current (the circulation of the reverse current is shown in FIG. 9C). During this time, the current decreases linearly to zero and the voltage across the coil becomes $-U_{COIL}$ due to self-induction. This portion of current decrease (usually referred to as "tail current") is crucially important to the energy efficiency of the matrix machine. In order to prevent negative torque production due to the tail current, the inductance of the coils in which the current flows has to remain constant. This means that the rotor poles have to remain in full alignment with the stator poles during their rotational motion until the current reaches a zero value. To achieve this, the rotor poles must have a tangential size greater than that of the stator pole. The subunity overlap ratio, discussed previously, is required precisely for this reason and it is calculated as a function of the maximum rotational speed of the machine. The hatched areas of the current diagram (shown in FIG. 7B) represent the portion of the current pulse that is injected by the power supply. The greater the sum of these areas versus the sum of non-hatched areas (where the current is freewheeling), the higher the mechanical power generated by the machine at any given rotational speed.

Figure 8:
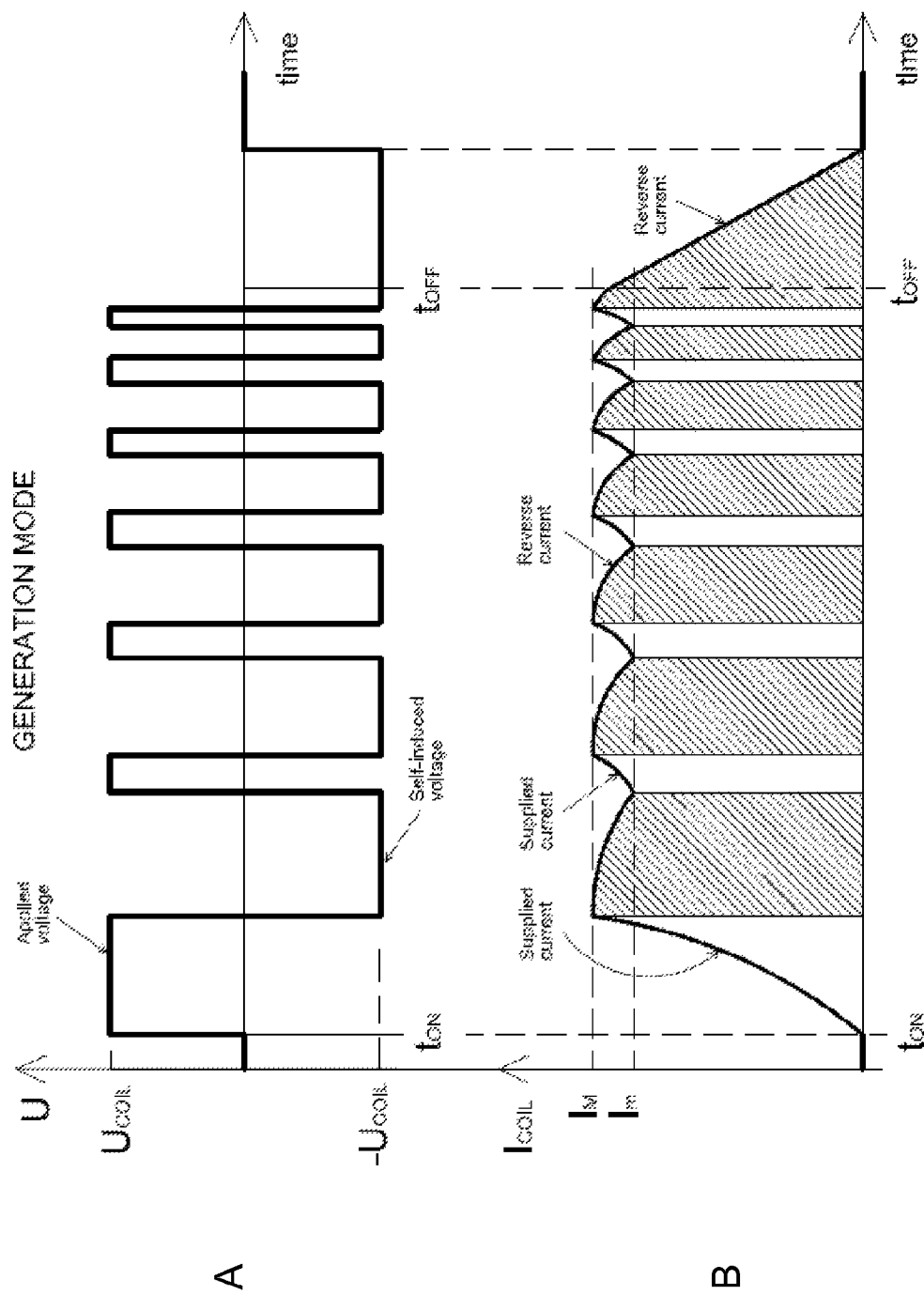
FIG. 8 shows the waveforms of the voltage across the coil of an active element (FIG. 8A) and the current circulating in the coil (FIG. 8B) in generation mode.

FIG. 8 shows the waveforms of the voltage applied to the coil of an active element ($U_{COIL}$) and the current circulating in the coil ($I_{COIL}$) in generation mode. In order to produce a discrete action in generation mode, the principle of operation requires injecting an initial current pulse in the coil of an active element, for the purpose of generating the magnetic attraction force that will oppose the rotor motion caused by a prime mover. This is done by applying the voltage $U_{COIL}$ across the coil (shown in FIG. 8A), as prompted by the corresponding scanning algorithm for the generation mode. In order to limit the current to the constant value we want, the same chopping technique described for the motoring mode is used (shown in FIG. 8B). When the current value $I_M$ is reached, the current is cut off. The rotation of the rotor by the prime mover will move the rotor pole out of alignment with the stator poles and the magnetic force produced in the air gap will oppose this motion. As a consequence, the magnetic field is reinforced by the action of the prime mover. A direct result is the generation of a supplemental reverse current which will be added to the existing current when it is decreasing from $I_M$ to $I_m$. Therefore, the current will decrease much more slowly than in motoring mode. Moreover, the current is not allowed to freewheel between $I_M$ and $I_m$, instead it is routed back to the power supply, since the goal is to generate electrical energy that can be collected by the storage element of the primary power supply. The current will therefore swing between the $I_M$ and $I_m$ values until it is cut off permanently when the stator-rotor poles become fully unaligned. The magnetic force that opposes the rotor motion caused by the prime mover is generated sequentially by the matrix rows. The superposition (time integration) of the opposing forces generated by each row will be a continuous constant force, similar to that generated in motoring mode. Consequently, the prime mover will sense an opposing force that is continuous and constant in magnitude. Obviously, the generated current pulse does not have a constant value between moments $t_{ON}$ and $t_{OFF}$, being comprised of a series of pulses of varying duration. However, in generation mode this is not a concern, since the resulting electrical energy is accumulated in a storage device (such as a battery or a bank of capacitors) which inherently smoothes it out. The waveform of voltage $U_{COIL}$ that is used to produce current $I_{COIL}$ is different from that of the voltage applied in motoring mode. This voltage is cycling between values $U_{COIL}$ and $-U_{COIL}$ ($U_{COIL}$ is the voltage applied to the coil when prompted by the scanning algorithm, while $-U_{COIL}$ is generated by the coil through self-induction), driven by the circuitry used in the chopping technique. When the voltage is equal to $U_{COIL}$, the initial current is increasing from zero to $I_M$ at the start of the current pulse and from $I_m$ to $I_M$ during the rest of the pulse. During this time, the machine draws electrical energy from the power supply, which is transformed solely into magnetic energy accumulated in the air gap. When the current is cut off, the voltage across the coil is switched to $-U_{COIL}$ through self-induction and the current decreases from $I_M$ to $I_m$ during the pulse, and from $I_M$ to zero at the end of the pulse. During this time, the machine draws mechanical energy from the prime mover and converts it into electrical energy carried to the power supply by the reverse current. At the end of the pulse, the remaining magnetic energy in the air gap is transferred to the power supply via the reverse stator current (recovery current) during its decrease from $I_m$ to zero. The hatched areas of the current diagram represent the portion of the current pulse that carries energy to the power supply. The greater the sum of these areas versus the sum of non-hatched areas (where the current is supplied by the power supply), the higher the electrical power generated by the machine at any given rotational speed. The essential difference between the motoring and the generation modes consists in the fact that the motoring mode uses all three circulation modes of the current (injection, freewheeling and reverse), while the generation mode uses only the injection and the reverse circulation modes of the current.

Figure 9:
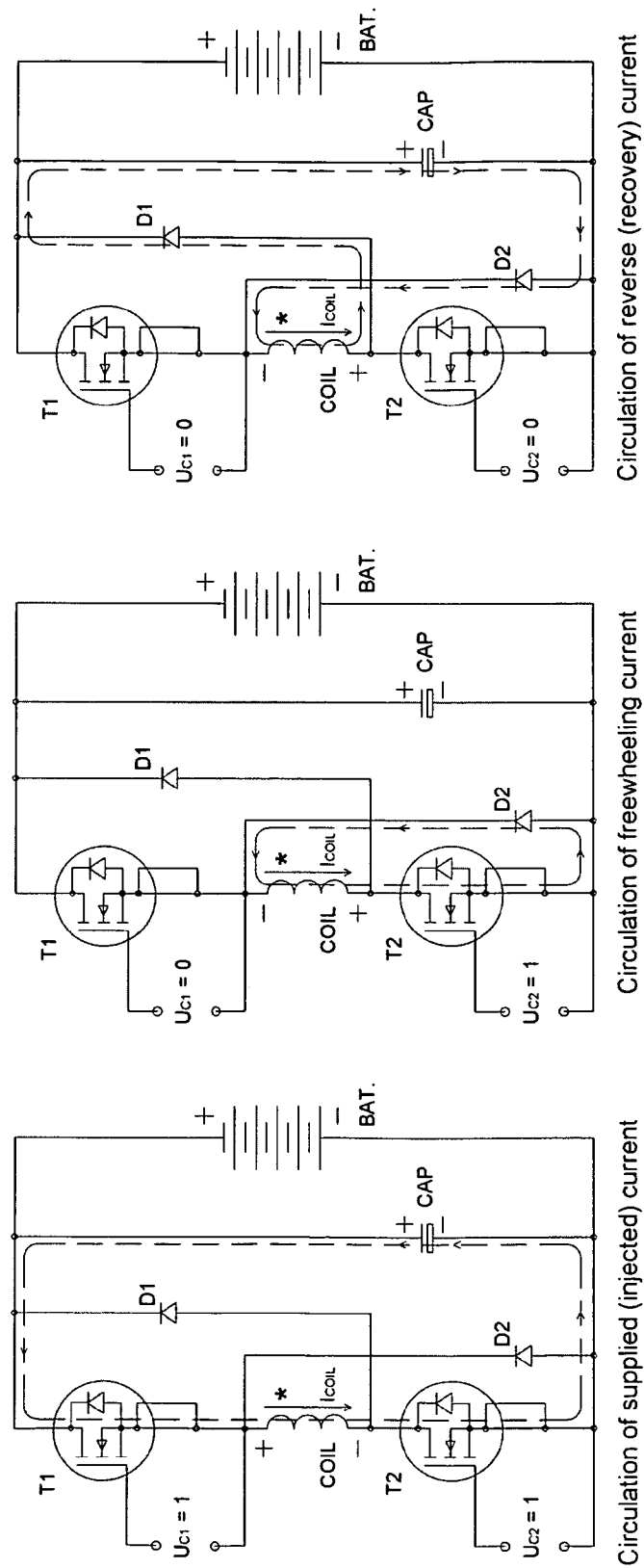
FIG. 9 shows the electric current circulation through the coil of an active element during the supply stage (FIG. 9A), freewheeling stage (FIG. 9B) and recovery stage (FIG. 9C) of a current pulse cycle.

FIG. 9 shows the electric current circulation through the coil of an active element during various regimes of a current cycle. The electric circuit exemplified in this figure is called in literature "half-bridge" driver. This type of circuit allows the coil of an active element to be connected to the power supply in either direct or reverse orientation at will. There are 3 different regimes of the current circulation through the coil, namely the supply, freewheeling and recovery regimes. In FIG. 9A, the circulation of the supplied current is shown. This current is injected in the coil when the voltage $U_{COIL}$ is applied across the coil. The application of this voltage, when prompted by the appropriate scanning algorithm, is controlled by the gate voltages of power transistors T1 and T2. Gate voltage $U_{c1}$ controls the gate of transistor T1, while gate voltage $U_{c2}$ controls the gate of transistor T2. A gate value equal to 1 represents a logic "high", while a gate value equal to 0 represents a logic "low". When both gate voltages $U_{c1}$ and $U_{c2}$ are high, both transistors are switched on and the coil is connected to the power supply with the direct orientation (the "star" side is connected to the positive battery electrode via open transistor T1, while the opposite side is connected to the negative battery electrode via open transistor T2). This current circulation carries electrical energy from the power supply to the coil. In FIG. 9B, the circulation of the freewheeling current is shown. In this regime, only one gate voltage is high and the other is low (in the case presented, $U_{c2}$ is high and $U_{c1}$ is low, but the alternate case of $U_{c1}$ high and $U_{c2}$ low gives a similar result). When transistor T1 is switched off, the coil can no longer be supplied with current from the power supply. As a result, the accumulated magnetic energy in the air gap starts to decrease, and this will cause the reversal of the voltage across the coil via self-induction. This reverse voltage will switch on diode D2 and a decreasing current is established in the coil via open diode D2 and open transistor T2. The reverse voltage across the coil is very low (being the sum of the direct voltage of open diode D2 and the saturation voltage of open transistor T2) and can be considered to be virtually zero in comparison with voltage $U_{COIL}$. This causes a very slow decrease of the current in the coil and the resulting current circulation is called "freewheeling". The freewheeling current sustains the tangential magnetic force that allows the machine to transform the magnetic energy stored in the air gap into mechanical energy in the rotor. This transformation will accelerate the decrease of the coil current from $I_M$ to $I_m$. In FIG. 9C, the circulation of recovery current is shown. In this regime, both gate voltages are low, so both transistors T1 and T2 are switched off. As a result, the self-induced reverse voltage across the coil will connect it to the power supply with reverse orientation (the "star" side is connected to the negative battery electrode via open diode D2 and the other side is connected to the positive battery electrode via open diode D1). This will give rise to the circulation of a reverse current, which allows the recovery of the remaining magnetic energy stored in the air gap in motoring mode. The same current circulation allows the mechanical energy supplied by the prime mover to be transformed into electrical energy, which is carried to the power supply by a reverse current in generation mode. The capacitor CAP connected in parallel with the power supply (battery) represents the temporary storage element for the operation of the machine in both motoring and generation modes, providing high current pulses of short duration to the coil in motoring mode and absorbing high current pulses of short duration from the coil in generation mode.

FIG. 9 can be used to show how the scanning algorithms can be translated in a digital format. To operate in any mode, the machine applies current pulses in the coils of the matrix rows by manipulating the voltage applied across the coils. This voltage has two discrete values, namely $U_{COIL}$ and zero, therefore it fits the definition of a discrete pulse that can be processed digitally. As can be seen in the figure, all three current regimes (supply, freewheeling and recovery) are controlled by two voltages ($U_{c1}$ and $U_{c2}$) that also have discrete values (high and low) and can be processed digitally. Essentially, a scanning algorithm can be represented by a state function that relates the state of the voltage applied across the coils of each matrix row ($U_{CN}$) to the state of the discrete signals coming from the position sensors ($U_P$), current chopping detectors ($U_D$) and operation mode controller ($U_C$) at each moment in time (t). Mathematically, the scanning algorithm can be expressed as a discrete multi-variable function $U_{CN}=f(U_P, U_D, U_C, t)$. The index N represents the ordinal number of each row in the matrix, so the state function $U_{CN}$ will have a set of N combinations [$U_P, U_D, U_C$], one for each matrix row at any given time t. The signals $U_P, U_D$ and $U_C$ can have value zero (low) or 1 (high) in the digital state function, depending on the state of their own source (which is an electronic circuit). When executed by an electronic processing module, the state function $U_{CN}$ will yield for each combination [$U_P, U_D, U_C$] a pair of discrete values for the gate voltages $U_{c1}$ and $U_{c2}$ for all the transistors in the power converter at all times. For instance, in a matrix machine with 3 rows, the logic unit will feed continuously sequences of 3 sets of gate voltages $U_{c1}$ and $U_{c2}$ to the power converter, which in turn will provide 3 voltages $U_{COIL}$ to the matrix rows (one for each row) for each sequence. The value $U_{COIL}$ of each of the 3 rows depends on the operations performed by the function $U_{CN}$, which are different for each operation mode. For a given operation mode, the results of the operations can be calculated at the design stage of the machine. These results are recorded in digital format in a memory module and represent the scanning algorithm for that particular operation mode. In practice, the matrix machine may feature additional discrete signals to be embedded in the state function, such as the signals generated by a thermal or over-current protection circuitry residing in the logic module, but they are not essential to the machine operation.

Figure 10:
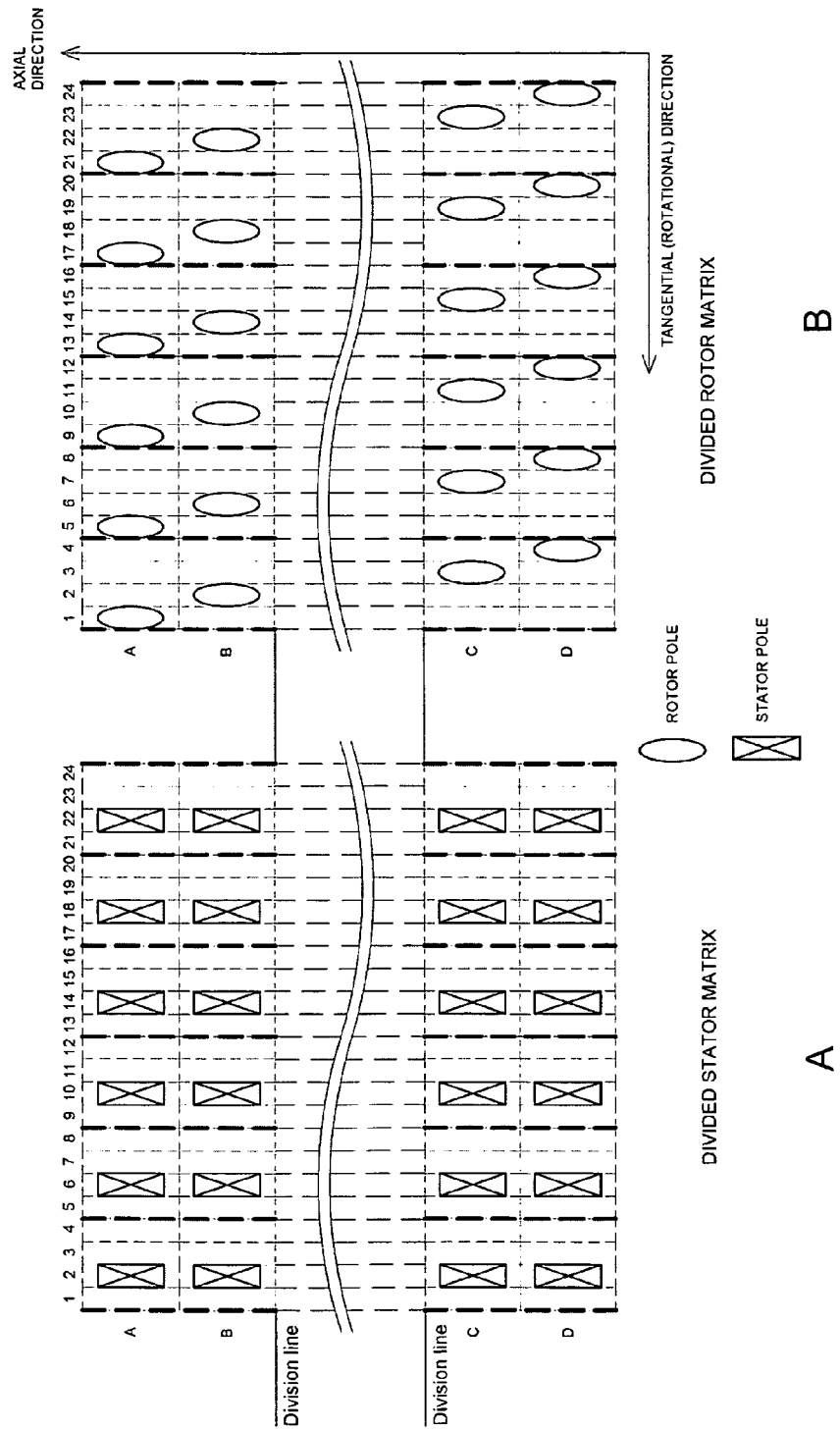
FIG. 10 shows the method of dividing a machine matrix into 2 separate machine sub-matrices that can operate co-dependently (stator matrix in FIG. 10A and rotor matrix in FIG. 10B).

FIG. 10 shows schematically the method of dividing a machine matrix into 2 separate machine sub-matrices that can be set physically wide apart from one another. The division of the machine matrix is performed by choosing a division plane perpendicular to the axial direction, containing one of the edges of a matrix row (along the tangential direction). A cut can be performed on both the stator and the rotor matrices along this plane in order to obtain two physically separated sub-matrices. In planar projection, the division plane is represented by a division line, which is common for both stator and rotor matrices (as shown in FIG. 10A). The sub-matrices thus obtained can be moved apart from one another in the axial direction on condition that the axial alignment of these sub-matrices is preserved. Both the stator sub-matrix (shown in FIG. 10A) and the rotor sub-matrix (shown in FIG. 10B) situated on the same side of the division line must be displaced along the axial direction by the same amount, in order to keep them aligned in the radial direction. The two matrix sub-machines resulting from the division of the original matrix machine will be operated as a single machine, as if they were not divided. In practice, the resulting rotor sub-matrices will be mounted on a common rotor shaft or will be linked by an interconnecting shaft in order to preserve the original tangential alignment. The division of the resulting sub-matrices can continue indefinitely, until each resulting sub-matrix is comprised of only one row.

Figure 11:
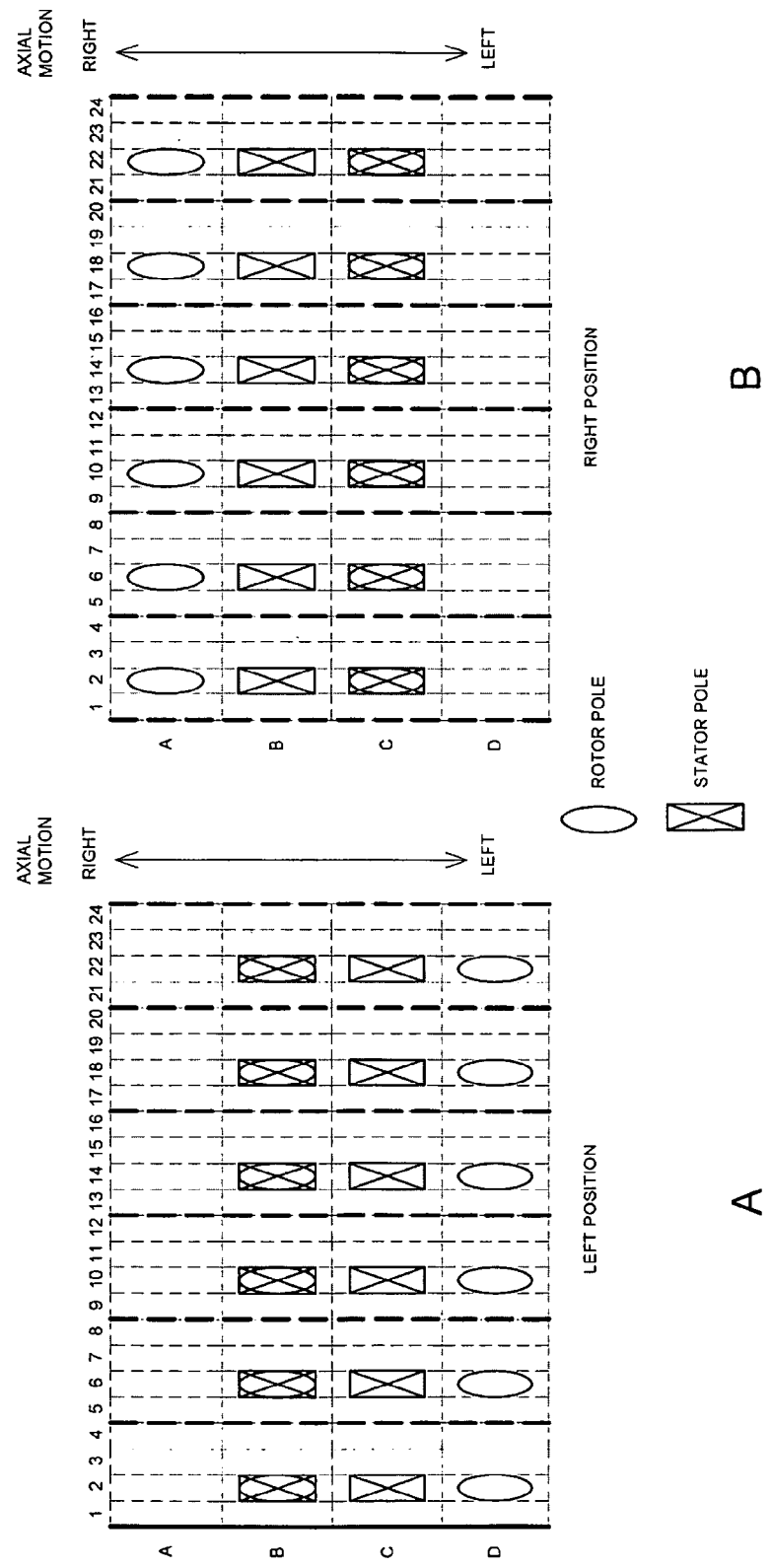
FIG. 11 illustrates the principle of matrix organization in a machine designated for axial (sliding) motion only, built with cylindrical stator and rotor matrices (shown in the left position in FIG. 11A and in the right position in FIG. 11B).

FIG. 11 illustrates schematically the principle of matrix organization in a machine designated for axial motion only. Such machine can be built with stator and rotor cylindrical matrices, where the rotor matrix performs not a rotational, but a translation motion along the axial direction. For instance, if the stator and rotor matrices have two rows each (as exemplified in the figure), the rotor can execute alternating translation motion between the left and the right positions during each elementary action. Such minimalist matrix machine can therefore perform an oscillating motion between the two extreme rotor positions (left and right, as shown in FIGS. 11A and 11B) if the rotor shaft is built as a frictionless slide in order to allow the rotor matrix to slide along the axial direction (no bearings are required, since the rotational motion is not produced in this machine). In the axial motion machine, the magnetic force that is being exploited is the axial component $F_A$, not the tangential component $F_T$ (which is exploited for the rotational motion). The tangential component can still be produced in this machine, but since it is not used it can be precluded by design. The advantage of using this machine over the existing linear machines (such as the linear SRMs) that can execute translation motion is that, by design, it does not generate the detrimental radial force which tends to attract the rotor poles towards the stator poles (in the matrix machine, this force is cancelled using the cylindrical symmetry of the machine). In the existing asymmetric linear machines, this force cannot be cancelled by design and poses considerable problems in practice (where it needs to be cancelled by mechanical means). A peculiar feature of this axial motion machine is that it can be operated with electric pulses that do not have to perform a complete discrete action. Instead, the current pulses can be cut off prior to the rotor reaching the extreme positions, so the final position of the rotor can be set at will anywhere between these positions. In such case, the rotor can move a load to any point between the two extreme positions by cutting the current pulses when this point has been reached. For precise load positioning, the axial position detector has to be built with the required position discrimination resolution.

Figure 12:
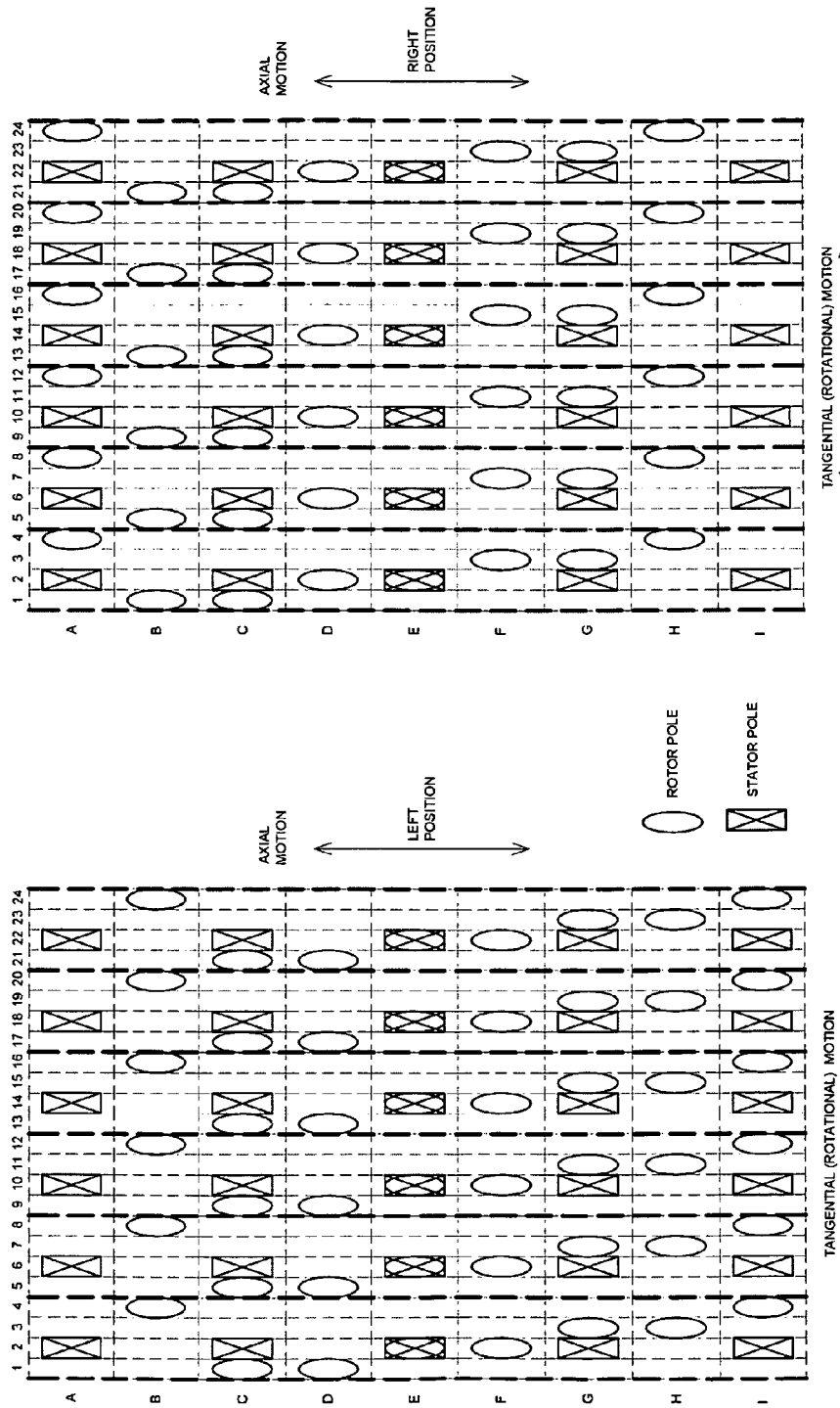
FIG. 12 illustrates the principle of matrix organization in a machine designated for helicoidal motion, having two axial rotor matrix positions (left position in FIG. 12A and right position in FIG. 12B).

FIG. 12 illustrates schematically the principle of matrix organization in a machine designated for helicoidal (spiral) motion. It can be seen that the machine matrix has one more stator row and three more rotor rows added. In general, in this type of machines the stator and rotor matrices have a different number of rows. As a rule, the more positions of the rotor are wanted on the axial direction, the more additional stator and rotor rows are required. Moreover, the arrangement of the stator rows is different from the arrangement required in the machines built for rotational motion only. The same applies to the arrangement of rotor rows. This machine is the most complex of the three possible types that can be built based on matrix organization (that is, the rotational motion, axial motion and helicoidal motion types). The helicoidal motion machines use both the rotational and axial motion simultaneously or alternately, and for this reason the matrix organization is much more difficult to perform in order to obtain a clean helicoidal motion of the rotor matrix with minimum number of active elements. In FIG. 12A, a matrix machine with two axial positions is shown, where the current position of the rotor matrix is the left position. In FIG. 12B, the same machine is shown, where the current position of the rotor matrix is the right position. The rotor matrix is allowed to slide between the left and right positions along the axial direction, while the rotor can spin around the axial direction. To obtain this kind of motion in practice, the rotor shaft is built with sliding bearing mounts which exhibit very small end-play when the direction of rotational motion is changed. This combined motion allows the rotor shaft and, therefore, the load attached to it to execute either a helicoidal motion with respect to the stator matrix or an alternating sliding and spinning motion. The scanning algorithms employed to perform this kind of motion are more complex than the ones used for simple rotational or translation motion, since the rotor matrix position needs to be monitored in two axes instead of only one. The helicoidal motion machine will need two sets of position sensors, one for each direction of motion (axial and tangential). For machines designed with more than two distinct positions of the rotor on the axial direction, the axial position detector will be more complicated, since it will have to monitor multiple discrete positions. This machine can perform either a discrete alternating motion between the extreme positions or a continuous motion between any two points along the axial direction while the rotor is spinning. This can be achieved by decreasing the amplitude of the current pulses injected in the coils of the extreme row from which the rotor needs to move away and increasing in the same proportion the amplitude of the current pulses injected in the coils of the extreme row toward which the rotor needs to move. When the target point has been reached, the amplitude of the current pulses injected in the coils of the extreme rows is maintained constant. In this position, the rotor is "hovering" at a fixed axial point, meaning it rotates without moving axially. For precise load hovering at certain axial points, the axial position detector has to be built with the required position discrimination resolution.

Figure 13:
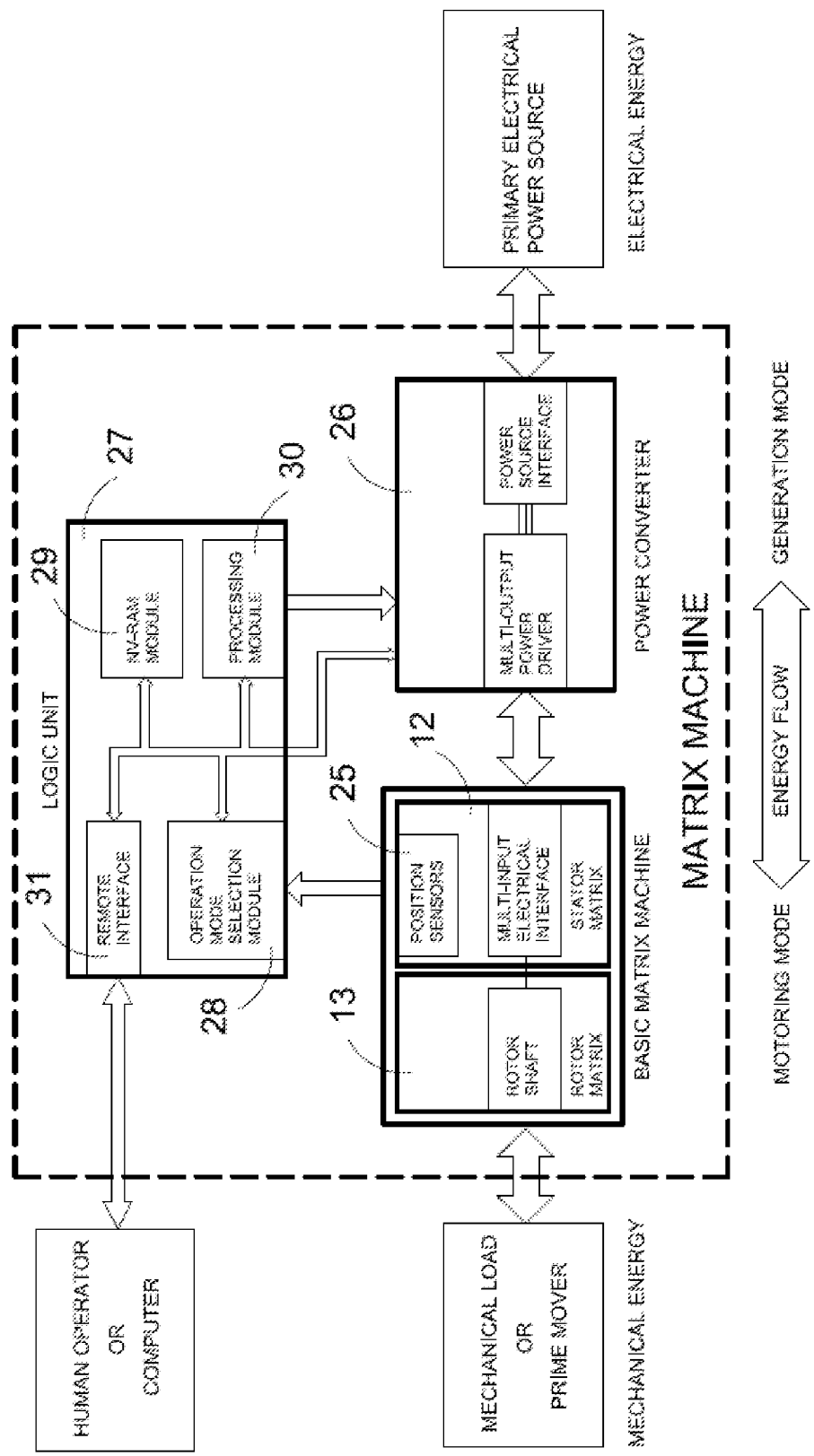
FIG. 13 shows the block diagram of a reciprocal matrix machine and its relationships with the external variables in both motoring and generation modes.

FIG. 13 shows the internal structure of the matrix machine as a block diagram. The block diagram takes account of the external elements with which various parts of the machine are interfaced. The diagram shows also the energy flow facilitated by the machine between the primary electrical power source and the mechanical load or the prime mover. In motoring mode, the energy flows from the primary electrical power source to the mechanical load. In this mode, the machine transforms the input electrical energy into output mechanical energy. In generation mode, the energy flows from the prime mover to the primary electrical power source. In this mode, the machine transforms the input mechanical energy into output electrical energy. The various internal parts of the machine exist solely to facilitate the energy flow in either operation mode. Structurally, the basic matrix machine is comprised mainly of a stator matrix 12, a rotor matrix 13, and a position sensor module 25 located on the stator matrix. The position sensors provide the instantaneous position of the rotor poles with respect to the stator poles for all matrix rows. This position is required to determine which rotor poles are in the position of increasing alignment with the corresponding stator poles in motoring mode. The same information is required to determine which rotor poles are in the position of decreasing alignment with the corresponding stator poles in generation mode. If the power converter is capable of sensorless rotor position detection, the position sensor module can be omitted. Regardless of the means employed to detect the rotor motion, the rotor position information is calculated by the electronics associated to the position sensor and provided to the logic control unit as discrete signals (or in digital format). The power converter 26 is comprised of a number of power drivers of known construction (such as those presented in FIG. 9) and their associated control circuitry. Usually, a power driver controls one power converter output. The minimum number of power outputs should be equal to the number of groups of active elements. If the groups of active elements coincide with the matrix rows, then the number of power outputs should be equal to the number of matrix rows. In general, the current sensors that are used in the current chopping technique are located in the power converter (where each power driver is sampled for the instantaneous value of the current furnished to the group of active elements driven by such driver). A power source interface of known construction provides constant line voltage and high direct current to the power converter internal circuitry in motoring mode, and also transforms the raw electrical energy produced by the machine in a suitable form in generation mode. The logic unit 27 is comprised of an operation mode selection module 28, a non-volatile random access module (NV-RAM) 29, a processing module 30 and an optional remote interface 31. The non-volatile random access memory is an electronic memory module employed to store the scanning algorithms of the machine matrix for various operation modes, as shown in the discussion of FIG. 9. The memory is pre-programmed with the necessary algorithms determined at the design stage and must preserve the integrity of the algorithms when the power supply is turned off (this is the reason why the memory must be non-volatile). If the logic units are used in matrix machines with simple motion (such as rotational motion only), the scanning algorithms are uncomplicated and can be hard-wired on a standard electronic board instead of being pre-programmed in a dedicated memory module. The operation mode selection module receives the command to choose a particular scanning algorithm either locally (from a machine front panel) or remotely (via a command link) from a process computer or a human operator. The remote command link is very useful in applications where the matrix machine is located in hard-to-reach areas (such as a wind turbine hub, under-water equipment, etc.) and its performance has to be monitored closely. The processing module retrieves the data from the memory module and generates discrete electrical commands (gate voltages) in the correct format for each of the inputs of the power drivers residing in the power converter, which in turn generate the voltages to be applied to the coils located on each row of the stator matrix. This module also determines the amplitude of the current pulses in the coils, in order to control the output mechanical power generated by the matrix machine in motoring mode and the amount of opposing torque required in generation mode, in order to adjust the machine parameters to the desired load conditions. In addition, the processing module takes care of the internal monitoring of machine operation, by collecting data from the various sensors (such as stator core temperature, coil current, rotor position, etc.) and generating control signals for the adjustment of the machine parameters chosen to be monitored. The processing module can also perform calculations in order to provide user information concerning the state of the machine at any time. For instance, the discrete signals generated by the position sensors can be used to extract the rotational speed of the rotor by counting the rotor position pulses and displaying them in a standard digital format as rpm (revolutions per minute) on a digital display (either on the machine panel or remotely, via the remote interface). Similarly, the instantaneous value of the current pulses and their frequency, provided by the sensors located in the current chopping circuitry, can be processed to generate information about the electrical power consumed by the machine in motoring mode, or about the electrical power produced in generation mode.

Figure 14:
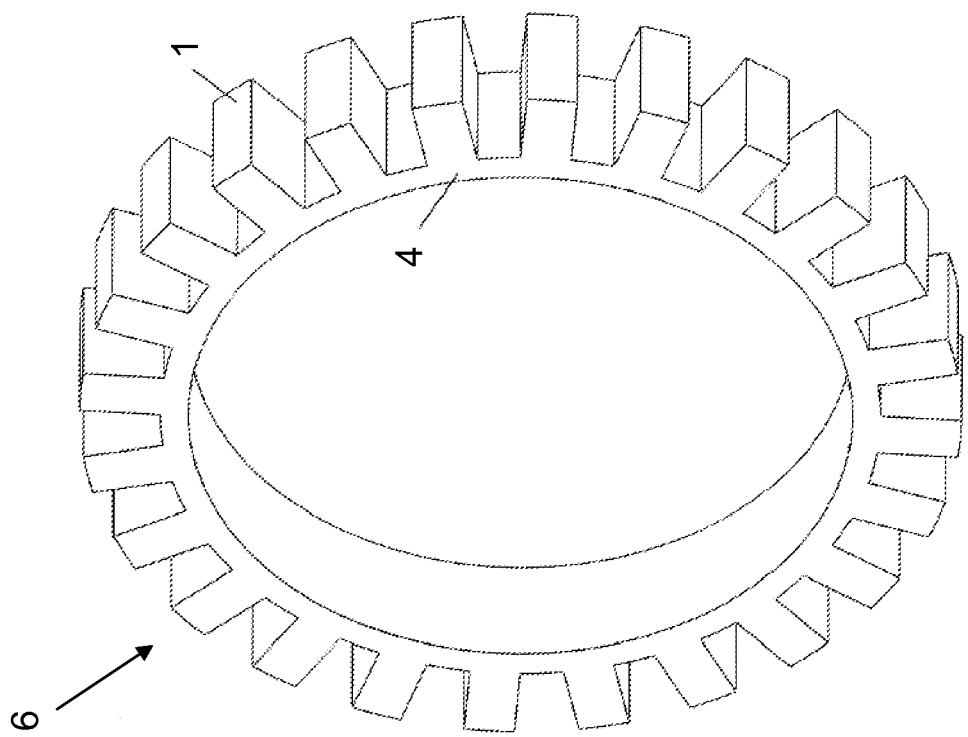
FIG. 14 shows the structure of a stator stack with 24 poles.

FIG. 14 shows the structure of the stator core of a specific cylindrical matrix with 24 columns (isometric view). The stator core is comprised of 24 stator poles 1, arranged in a circular pattern on stator back path 4, which is shaped as an annular ring (this annular ring is the cylindrical equivalent of the linear stator back path referenced previously in the planar matrix). The stator core can be built by assembling a certain number of laminates cut from silicon steel sheets. By stacking the laminates together, the poles and the annular ring are obtained as a congruous stator stack 6. Because the poles are positioned at the exterior of the annular ring, the resulting stator stack will be used to build a matrix machine on reverse topology (rotor outside). The stator stack built for a matrix machine on default topology (rotor inside) will have the stator poles 1 positioned on the other side of the annular ring (pointing inward).

Figure 15:
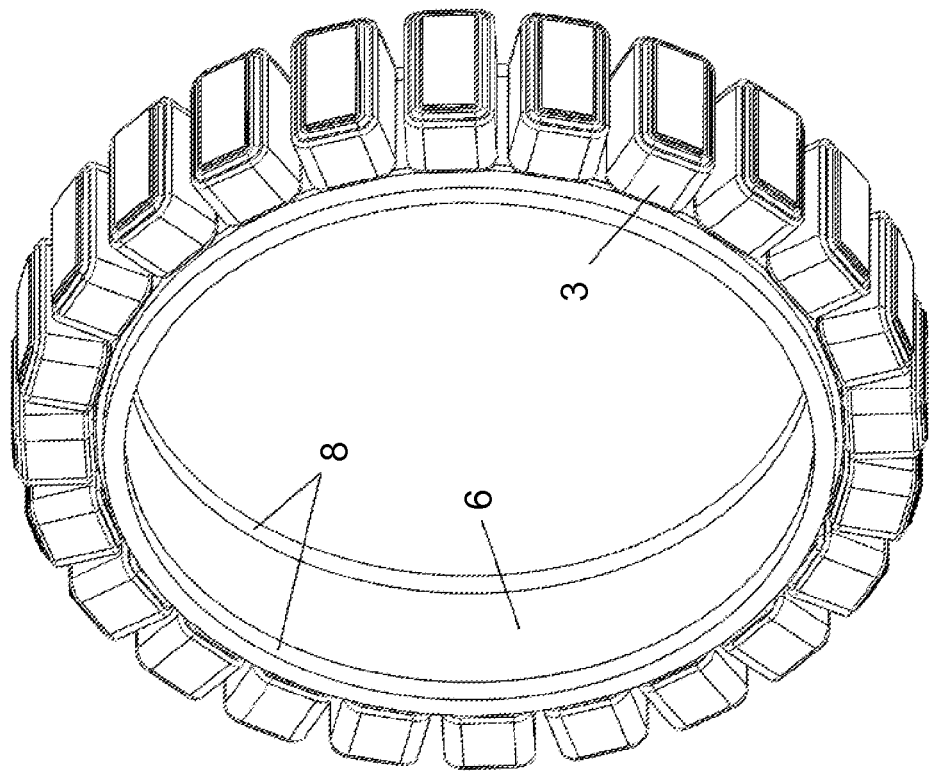
FIG. 15 shows the structure of a complete stator row with 24 poles.

FIG. 15 shows the structure of the stator row assembly of a specific cylindrical matrix with 24 columns (isometric view) built using the stator stack shown in FIG. 14. A coil 3 is mounted on each pole of stator stack 6, therefore the stator row will feature 24 coils. A pair of non-magnetic stator rings 8 is mounted coaxially on each side of the annular ring of the stator stack. The purpose of the non-magnetic rings is to provide the required axial spacing between adjacent stator rows in a bi-dimensional matrix machine and to ensure firm magnetic separation between neighboring rows. Each coil is made of copper wire wound in a few layers in order to obtain the required number of turns. Depending on the specific use of the resulting matrix machine, the coils can be interconnected as a single compound coil routed to the power converter that will drive the machine, or each coil can be routed individually to the power converter.

Figure 16:
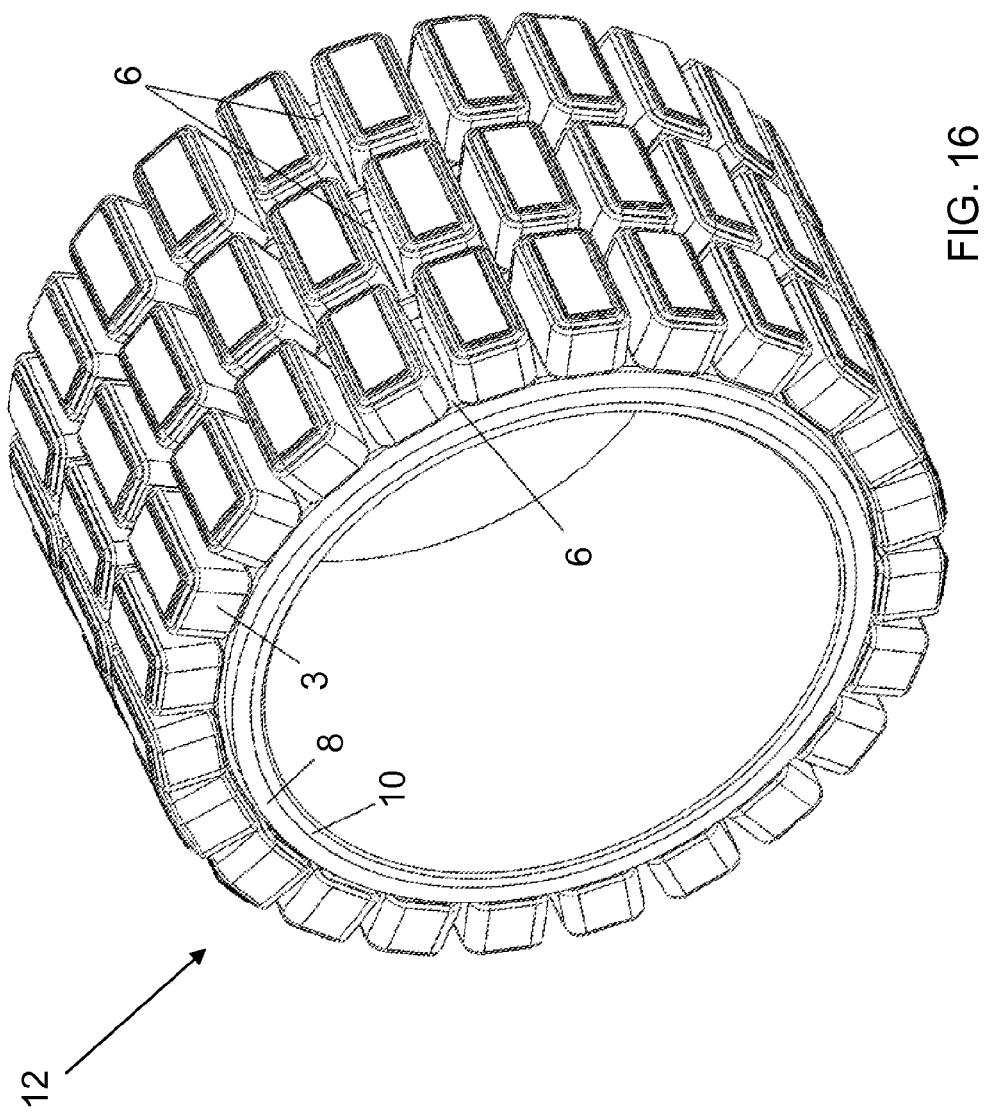
FIG. 16 shows the structure of a complete bi-dimensional stator matrix with 3 stator rows and 24 columns.

FIG. 16 shows the structure of a complete stator matrix with 24 columns obtained by assembling 3 of the stator row assemblies shown in FIG. 15 (isometric view). The stator rows are positioned coaxially and parallel to each other along the axial direction. The result is a cylindrical stator matrix with a 24×3 bi-dimensional size and therefore is comprised of 24×3=72 stator poles, each holding a coil 3. The stacks of all stator rows are mounted on stator support 10, which is made of a cylindrical tube of non-magnetic material (such as aluminum or copper alloy). The stacks of adjacent rows are separated axially by two non-magnetic stator rings 8. The stator rows are secured on the stator support in such position as to ensure that all stator poles are co-linear in the axial direction. In the finished stator matrix structure, the faces of the stator poles form a cylindrical matrix of rectangular cells that are co-linear in the axial direction.

Figure 17:
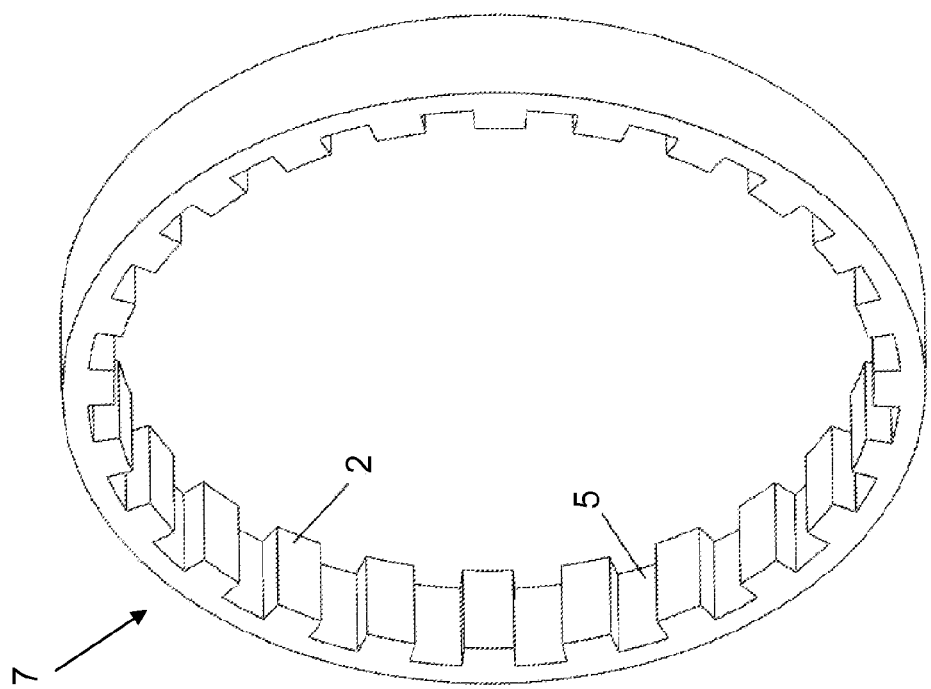
FIG. 17 shows the structure of a rotor stack with 24 poles.

FIG. 17 shows the structure of the rotor core of the specific cylindrical matrix with 24 columns referenced in FIG. 14 (isometric view). The rotor core is comprised of 24 rotor poles 2, arranged in a circular pattern on the rotor back path 5, which is shaped as an annular ring (this annular ring is the cylindrical equivalent of the rotor back path referenced previously in the planar matrix). The rotor core can be built in the same manner as the stator core, namely by assembling a number of laminates cut from silicon steel sheets. By stacking the laminates together, the poles and the annular ring are obtained as a congruous rotor stack 7, as in the case of the stator stack. Because the poles are positioned at the interior of the annular ring, the resulting rotor stack will be used to build a matrix machine on reverse topology in conjunction with the stator stack shown in FIG. 14. The rotor stack built for a matrix machine on default topology (rotor inside) will have the rotor poles 2 positioned on the other side of the annular ring (pointing outward).

Figure 18:
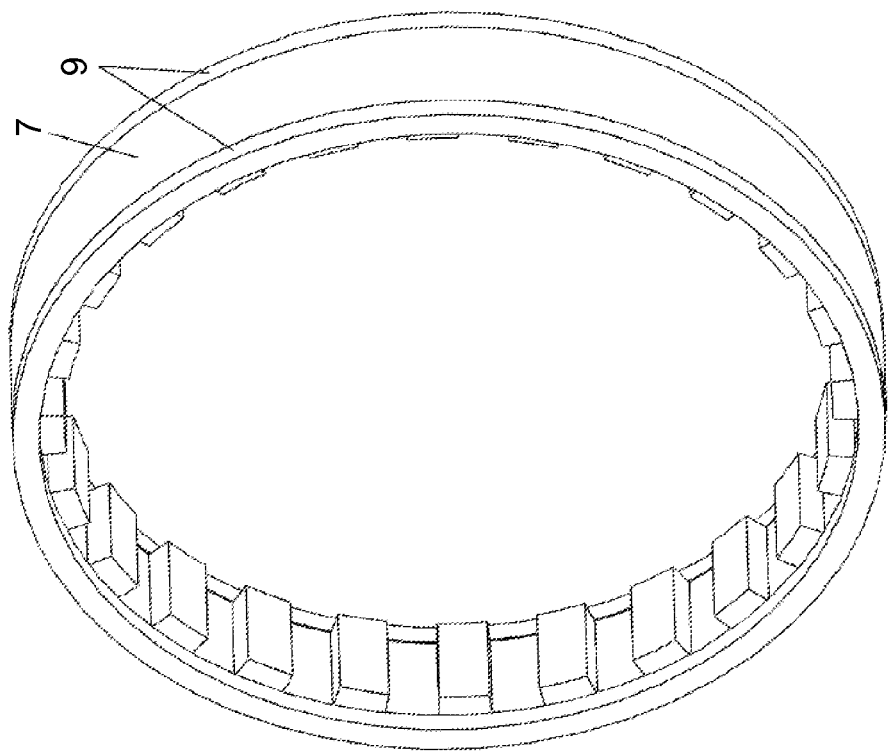
FIG. 18 shows the structure of a complete rotor row with 24 poles.

FIG. 18 shows the structure of the rotor row assembly of the specific cylindrical matrix with 24 columns (isometric view) using the rotor stack shown in FIG. 17. A pair of non-magnetic rotor rings 9 is mounted coaxially on each side of the annular ring of the rotor stack. As in the case of the stator row, the purpose of the non-magnetic rings is to provide the required axial spacing between adjacent rotor rows in a bi-dimensional matrix machine and to ensure firm magnetic separation between these rows. In order to ensure co-planarity of the stator and rotor rows in a bi-dimensional matrix machine, the axial size of the non-magnetic rotor rings 9 has to be proportional to the axial size of the non-magnetic stator rings 8.

FIG. 19 shows the structure of a complete rotor matrix obtained by assembling 3 of the rotor row assemblies shown in FIG. 18 (isometric view). The rotor rows are positioned coaxially and parallel to each other along the axial direction. The result is a cylindrical rotor matrix with a 24×3 bi-dimensional size and therefore is comprised of 24×3=72 rotor poles. The annular rings of all rotor rows are mounted on rotor support 11, which is made of a cylindrical tube of non-magnetic material (such as aluminum or copper alloy), as in the case of the stator support. The stacks of adjacent rows are separated axially by two non-magnetic rotor rings 9, as in the case of the stator matrix. The rotor rows are secured on the cylindrical rotor support in such position as to ensure that the rotor poles of adjacent rows are shifted in the tangential direction by an angle equal to 360 divided by the total number of active elements in the machine matrix. In the present case, the shift angle is equal to 360/72=5 degrees. In the finished rotor matrix structure, the faces of the rotor poles form a cylindrical matrix of rectangular cells that are not co-linear, but slanted in the axial direction, due to the shifting of adjacent rows.

FIG. 20 shows an isometric view of a matrix machine built on reverse topology, with the stator matrix and the rotor matrix located in their operating position. Due to the reverse topology used, the stator matrix is positioned inside the rotor matrix. The machine matrix is built by assembling the stator matrix 12 (built as shown in FIG. 16) and the rotor matrix 13 (built as shown in FIG. 19) using a set of connecting parts that are not shown in this view. Therefore, the machine matrix will have 3 rows and 24 active elements per row, for a total of 72 active elements. As a result, the generic machine matrix will have a number of 3×24×3=72×3=186 cells.

FIG. 21 shows an exploded isometric view of the machine matrix shown in FIG. 20, where the rotor matrix is nudged axially in order to reveal the stator matrix (which normally resides inside the rotor matrix). In this view, the stator matrix 12 is shown mounted on stator bracket 14. This bracket is used to install the whole matrix machine on its basis (such as the chassis of industrial equipment).

Figure 22:
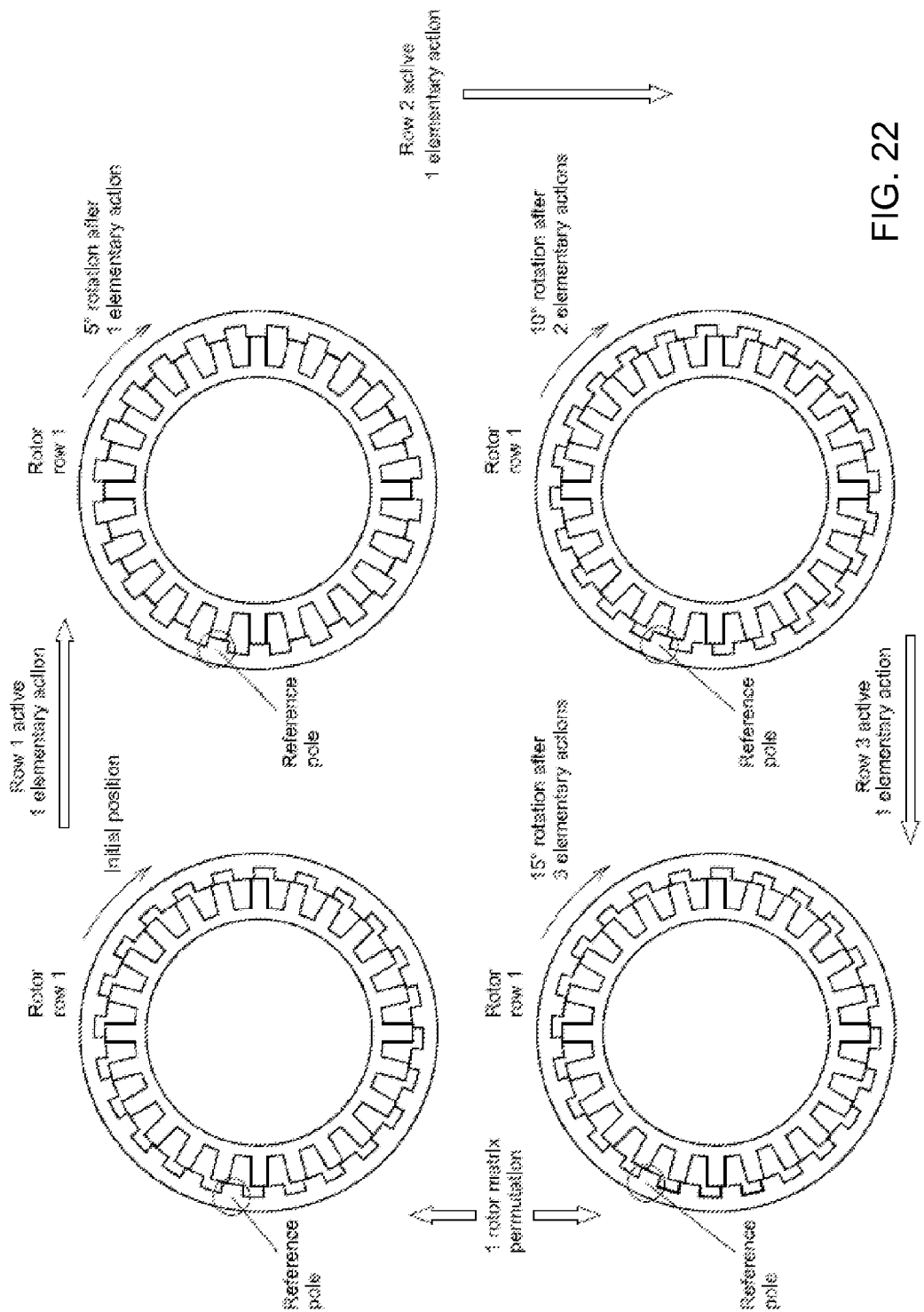
FIG. 22 is a synoptic representation of the rotor matrix motion in a bi-dimensional matrix with 3 rows and 24 columns during a rotor matrix permutation.

FIG. 22 is a synoptic representation of the results of elementary actions performed by a bi-dimensional machine matrix with 3 rows and 24 active elements per row during a rotor matrix permutation. The rotor matrix permutation is defined as the minimal succession of elementary actions required to achieve a new rotor matrix position that is indistinguishable from the previous (original) position. As can be seen in the figure, the minimum number of elementary actions required to perform a permutation is equal to the number of matrix rows. In the figure, the position of a rotor row is shown in the successive positions reached after each elementary action. The first elementary action, performed by the first row, rotates the rotor matrix clockwise by 5 degrees. The second elementary action, performed by the second row, rotates the rotor matrix clockwise by another 5 degrees (for a total of 10 degrees). The third elementary action, performed by the third row, rotates the rotor matrix clockwise by yet another 5 degrees (for a total of 15 degrees). It can be seen that, after 3 elementary actions, the rotor poles are in a new position that is indeed indistinguishable from the initial position. The evolution of a reference pole through the three successive 5 degree rotations illustrates how a rotor matrix permutation occurs.

Figure 23:
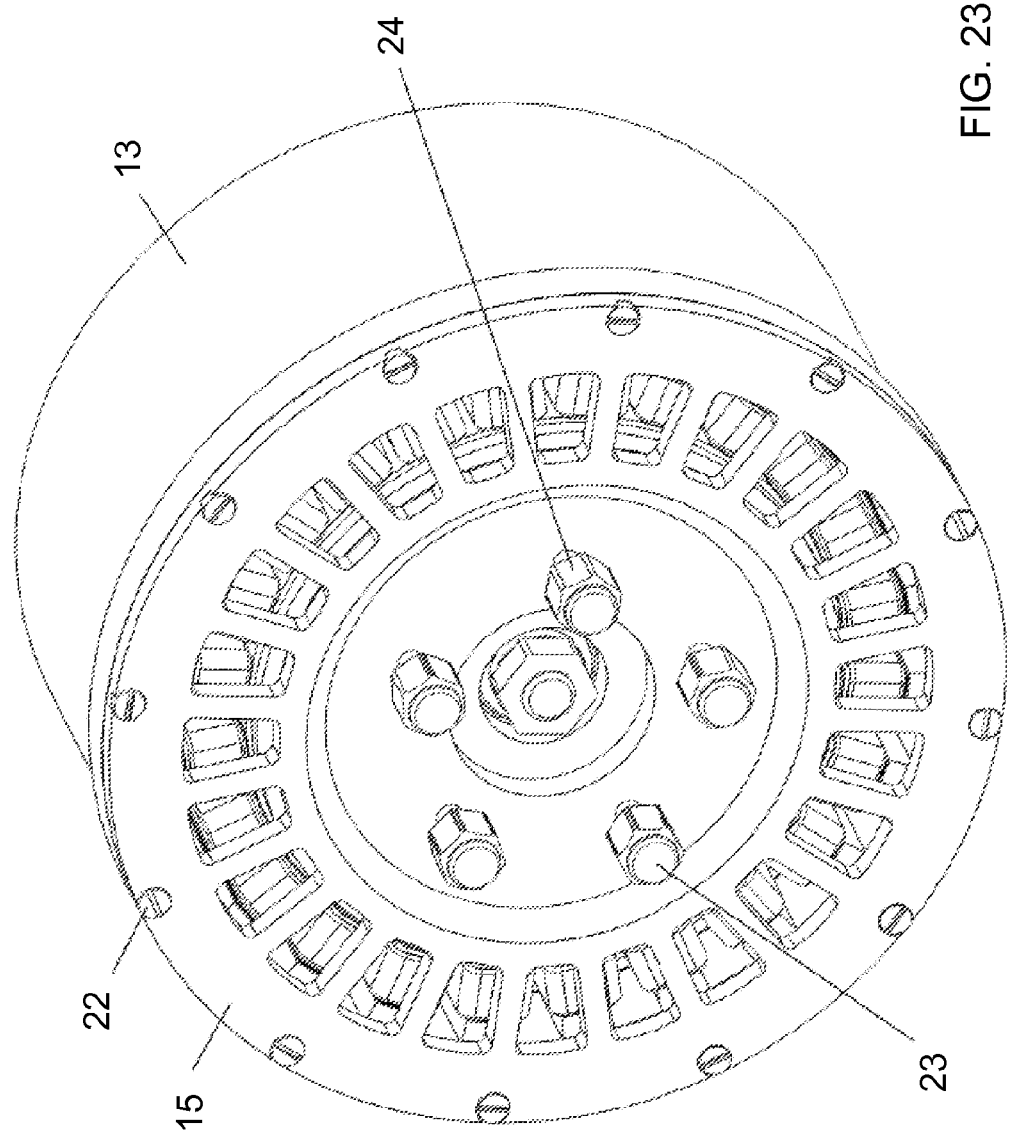
FIG. 23 is an isometric view of a matrix machine in the preferred embodiment.
Figure 24:
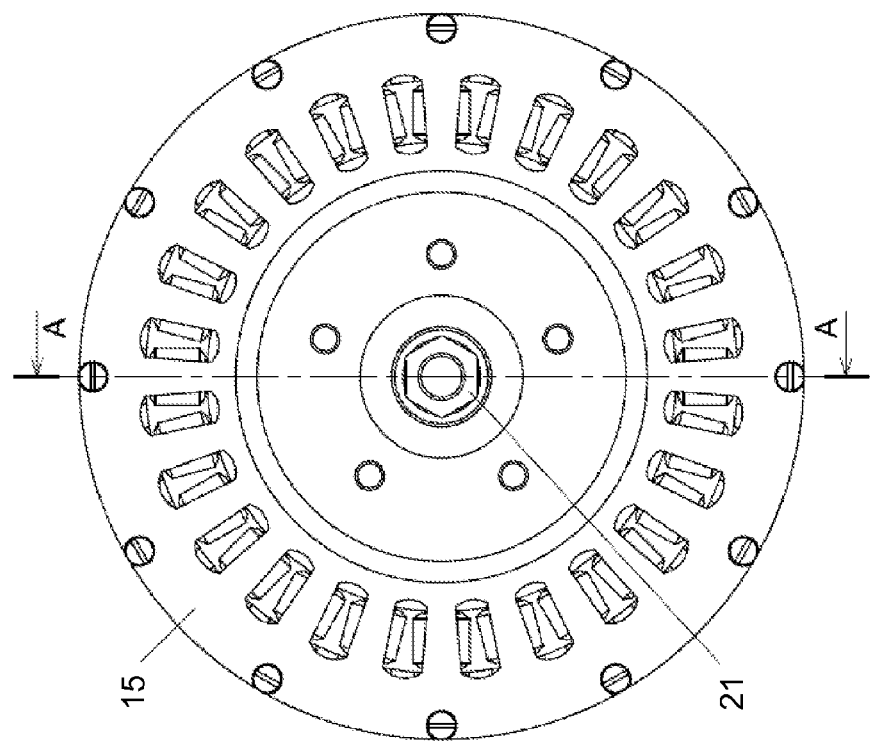
FIG. 24 is the front view of a matrix machine in the preferred embodiment.
Figure 25:
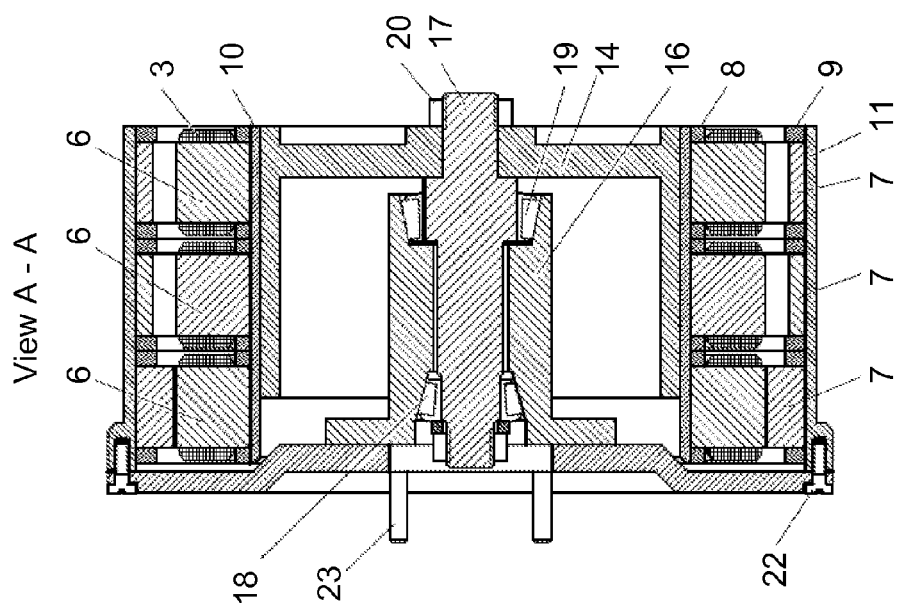
FIG. 25 is the cross-sectional view of a matrix machine in the preferred embodiment.

FIGS. 23, 24 and 25 show various views of a matrix machine with 3 rows and 24 columns built in the preferred embodiment and will be referenced in the next section.

Description of the Preferred Embodiment

As stated previously, the matrix machines can be built with the same number of components in either default topology (rotor inside) or reverse topology (rotor outside). The preferred embodiment presented here is based on a reverse topology matrix core.

With reference to the drawings and, in particular, with reference to drawings in FIG. 23 through 25, the preferred embodiment of a matrix machine with 3 rows and 24 active elements per row (for a total of 72 active elements for the entire machine) is shown. The machine matrix is comprised of a stator matrix (not visible in these views, but shown previously in FIG. 20) and a rotor matrix 13, positioned coaxially. The rotor matrix is held in coaxial alignment with the stator matrix via stator bracket 14, rotor bracket 15, rotor shaft 16, stator spindle 17, front bearing 18 and rear bearing 19. In order to preclude the axial motion of the rotor shaft, the bearings are of tapered type and are maintained in a fixed axial position by front locking nut 21. FIG. 25 shows an axial cross-section of the machine, exhibiting most of the machine parts and their inter-relationships. Stator spindle 17 is inserted into stator bracket 14, where it is secured in place by rear locking nut 20. The two tapered bearings, mounted rigidly on stator spindle 17, hold rotor shaft 16, which in turn holds rotor bracket 15 (to which it is attached mechanically) in coaxial alignment with stator spindle 17. A number of screws 22 attach rotor matrix 13 to rotor bracket 15. In this arrangement, the rotor matrix is free to revolve around the stator matrix, while the axial motion of the rotor matrix is precluded. A number of five threaded bolts 23, mounted rigidly on rotor bracket 15, are employed to attach the load to the rotor matrix. To be attached to the rotor matrix, the load must feature a mechanical interface with five holes that can fit snugly in the five threaded bolts 23. After inserting the load interface through the threaded bolts, it is secured in place by threaded nuts 24, which are mated with the threaded bolts. The cross-section in FIG. 25 also shows the constitutive parts of the stator and rotor matrices. The stator rows featuring stator stacks 6 and coils 3 are mounted on stator support 10, where they are separated axially by non-magnetic stator rings 8. The rotor rows featuring rotor stacks 7 are mounted on rotor support 11, where they are separated axially by non-magnetic rotor rings 9.

The matrix machine presented in the preferred embodiment and featuring the specific parts shown above has been designed for a particular purpose, namely to drive loads that require high torque and low rotational speeds. A very good example of such load is the wheel of an electric car. In order to be able to pick up speed quickly starting from stand-still (especially when driving uphill), the electric car requires high torque from the electric motors powering the wheels. The majority of the existing solutions for electric cars employ standard low-torque high-speed electric motors, which need a mechanical gear reduction (a gearbox) in order to obtain the high-torque low-speed required. By contrast, the matrix machine achieves the same goal without a gearbox, since it can produce by design the rotational motion with the precise parameters required. Due to the matrix organization of the active elements, one elementary action is required to rotate the rotor matrix by an angular step corresponding to a matrix cell size. In the matrix machines, the angular step is equal to 360 degrees divided by the number of matrix cells. A matrix machine with 3 rows and 24 active elements per row has 72 cells, therefore the angular step is 360/72=5 degrees. Evidently, in order to achieve a full revolution, the machine matrix has to perform a combined number of 72 discrete actions. This means that each stator row must be energized 24 times to produce a full revolution of the machine shaft. The high number of discrete actions per rotor matrix revolution realizes the "gear reduction" function mentioned above. An essential advantage of the matrix machine is the production of very high starting torque. Moreover, the torque remains constant for the whole range of rotational speed for which the machine is designed. Because of this feature, the mechanical power developed by the matrix machine is proportional to the rotational speed only (since the mechanical power is the product between the torque and the rotational speed). In order to operate at constant power, the matrix machine needs to reduce the torque in direct relation with the rotational speed, which is easily achievable by reducing progressively the amplitude of the electric current pulses applied to the stator coils.

The typical application for the matrix machine presented in the preferred embodiment is as a direct-drive motor for electric vehicles. In this application, the matrix machine is embedded directly in the wheel. The wheel rim, featuring five holes, is attached to the machine rotor matrix through threaded bolts 23 and secured with threaded nuts 24 (shown in FIG. 23). The wheel rim is not shown in this view, in order not to obscure the matrix machine elements behind it, but its shape can be inferred to follow closely the profile of the rotor bracket to which it is secured by the threaded nuts. The machine is operated in motoring mode through a power converter which draws electrical energy from the electric battery of the vehicle. As shown previously, the matrix machine is capable of regenerative braking (in which case the machine is switched to operate in generation mode when the brake is applied). With a properly equipped power converter featuring 3 power drivers fitted with recovery circuitry and a logic unit programmed with the required matrix scanning algorithms, the regenerative braking of the vehicle can be used to recover the kinetic energy of the vehicle when braking (this takes place when the car needs to be brought to a stop or when driving downhill). The electrical energy generated in this mode is fed back into the battery by the power converter, therefore conserving the energy in the battery and extending the autonomy of the electric vehicle.

The range of applications for the matrix machines is virtually unlimited. The specific examples of their potential use in industry (as electric variable speed drives), transportation (as replacement for internal combustion engines), climate control (as motors for HVAC, fans, pumps), electrical power generation, etc. would be too many to list. For instance, any industrial equipment powered by an electric motor, which drives a variable load or undergoes speed variations, can be retrofitted with a matrix machine. As an electrical power generator, the matrix machine would be the solution of choice for any power generation device driven by variable-power prime movers (such as wind turbines). In short, any application requiring an electric machine that must exhibit high energy efficiency, high reliability and extreme versatility can be served outstandingly by a matrix machine.

The embodiment of the invention in which an exclusive property or privilege is claimed are defined as follows:

1. A stand-alone reciprocal radial field electric machine comprising:
    a fixed cylindrical matrix having at least two circular rows, featuring a plurality of electromagnets arranged in designated matrix cells; and
    a mobile cylindrical matrix having at least two circular rows, positioned coaxially with respect to said fixed matrix, featuring a plurality of soft magnetic poles arranged in designated matrix cells; and
    an electrical power converter feeding the electromagnets of said fixed matrix with sequences of discrete electric current pulses; and
    a logic unit controlling the operation of said electrical power converter.

2. The electric machine of claim 1, wherein said fixed matrix is further enhanced with at least one position sensing module comprising a magnetic, optical or electronic device providing discrete electronic signals to said logic control unit upon detection of the rotational or axial motion of said mobile matrix.

3. The electric machine of claim 1, wherein said mobile matrix is physically located inside of said fixed matrix and is held in coaxial alignment by an assembly of parts allowing rotational motion of the mobile matrix, comprising:
    a set of brackets attached to said fixed matrix; and
    a set of bearings mounted on said brackets; and
    a shaft attached to said mobile matrix and mounted on said set of bearings.

4. The electric machine of claim 3, wherein said set of bearings is further enhanced with sliding mounts allowing the shaft attached to said mobile matrix to slide axially for an additional degree of freedom in the axial direction for the mobile matrix.

5. The electric machine of claim 1, wherein said mobile matrix is physically located outside of said fixed matrix and is held in coaxial alignment by an assembly of parts allowing rotational motion of the mobile matrix, comprising:
    a rotor bracket attached to said mobile matrix; and
    a shaft attached to said rotor bracket; and
    a spindle attached to said fixed matrix; and
    a set of bearings mounted on said spindle and holding said shaft.

6. The electric machine of claim 1, wherein said electromagnets located on the same circular row of said fixed matrix are electrically connected together as one group, where each group is connected individually to a separate output of said electrical power converter and each said output feeds discrete electric current pulses to its designated group of electromagnets.

7. The electric machine of claim 6, wherein the number of said power outputs of the electrical power converter is equal to the number of said groups of electromagnets and each output is further enhanced with circulation paths for the reverse electric current generated when said electric current pulses are switched off.

8. The electric machine of claim 7, wherein the number of electromagnets located on the circular rows of the fixed matrix is identical for all rows and is equal to the number of soft magnetic poles located on the circular rows of the mobile matrix.

9. The electric machine of claim 8, wherein the mobile matrix is comprised of the same number of circular rows as the fixed matrix and each row of the mobile matrix is axially aligned with a corresponding row located on the fixed matrix.

10. The electric machine of claim 7, wherein the logic control unit is further enhanced with dedicated modules comprising:
- a non-volatile random access memory module programmed with a set of scanning algorithms for the sequential activation of the electromagnets located on the fixed matrix; and
- a processing module providing the electrical power converter with discrete signals for the control of each converter output; and
- an operation mode selection module retrieving a selected scanning algorithm from said non-volatile random access memory for each operation mode and relaying it to said processing module for execution.

11. The electric machine of claim 10, wherein said set of scanning algorithms stored in said non-volatile random access memory contains a dedicated algorithm for at least one of the following operation modes: continuous motoring forward, continuous motoring in reverse, continuous generation forward, continuous generation in reverse, regenerative braking forward, regenerative braking in reverse, sequential rotation forward, sequential rotation in reverse, axial translation left, axial translation right, angular position seeking, axial position seeking, and full-load position holding.

12. The electric machine of claim 11, wherein the logic control unit is further enhanced with a discrete electronic interface linked to a remote controller operated by either a human operator or a process computer, capable of relaying remote control signals to the logic control unit for the machine operation and sending back operational status signals via a network transmission protocol.

13. The electric machine of claim 1, wherein said fixed cylindrical matrix is organized as a plurality of identical stator row assemblies mounted coaxially on a common cylindrical support made of aluminum or copper alloy such that the poles of all rotor row assemblies are aligned in straight columns along the axial direction, where each said stator row assembly comprises:
- a circular soft magnetic stator core with equally spaced salient poles; and
- an electrical coil located on each said salient pole; and
- a pair of non-magnetic rings mounted concentrically on each side of said soft magnetic stator core.

14. The electric machine of claim 13, wherein said stator row assemblies are modified to comprise electrical coils only on half of the stator poles, where the coils are uniformly distributed along the circumference of said soft magnetic stator core so that any stator pole holding a coil is adjacent on each side to a stator pole holding no coil.

15. The electric machine of claim 13, wherein said soft magnetic stator core is made of identical laminates cut out from industrial-grade silicon steel sheets and assembled together as a rigid stator stack.

16. The electric machine of claim 1, wherein said mobile cylindrical matrix is organized as a plurality of identical rotor row assemblies mounted coaxially on a common cylindrical support made of aluminum or copper alloy such that each rotor row assembly is progressively shifted tangentially with respect to its antecedent row assembly by an angle equal to 360 divided by the total number of electromagnets, where each said rotor row assembly comprises:
- a circular soft magnetic rotor core with equally spaced salient poles; and
- a pair of non-magnetic rings mounted concentrically on each side of said soft magnetic rotor core.

17. The electric machine of claim 16, wherein said soft magnetic rotor core is made of identical laminates cut out from industrial-grade silicon steel sheets and assembled together as a rigid rotor stack.

18. In the electric machine of claim 9, a method of obtaining two co-dependent machine sections by physically dividing said machine into two separate sections, comprising the steps of:
(a) splitting simultaneously both fixed and mobile matrices into two coaxial sub-matrices by cutting the original machine along a plane perpendicular to the rotation axis, situated midway between the neighboring edges of the rows bordering the cutting plane, so that one sub-matrix contains at least one row and the other sub-matrix contains the remaining rows; and
(b) displacing axially the two resulting machine sections and adding an extension shaft, so that the shafts of the mobile sub-matrices of both sections remain mechanically locked together via the extension shaft; and
(c) operating co-dependently the two resulting machine sections as one machine, in the same fashion as the original machine.

19. The method as recited in claim 18, wherein further cutting of the resulting machine sections having at least two rows is performed similarly, until all resulting machine sections end up with only one row.

* * * * *